US012269265B2

(12) United States Patent
Hasegawa et al.

(10) Patent No.: US 12,269,265 B2
(45) Date of Patent: Apr. 8, 2025

(54) LIQUID EJECTING HEAD AND LIQUID EJECTING APPARATUS

(71) Applicant: SEIKO EPSON CORPORATION, Tokyo (JP)

(72) Inventors: Yu Hasegawa, Shiojiri (JP); Hiroaki Okui, Azumino (JP); Eiichiro Watanabe, Matsumoto (JP); Yuma Fukuzawa, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 186 days.

(21) Appl. No.: 18/321,206

(22) Filed: May 22, 2023

(65) Prior Publication Data

US 2023/0373210 A1 Nov. 23, 2023

(30) Foreign Application Priority Data

May 23, 2022 (JP) ................................ 2022-083631

(51) Int. Cl.
*B41J 2/14* (2006.01)

(52) U.S. Cl.
CPC ........ *B41J 2/14* (2013.01); *B41J 2002/14491* (2013.01); *B41J 2202/08* (2013.01); *B41J 2202/13* (2013.01)

(58) Field of Classification Search
CPC ........................ B41J 2/14; B41J 2002/14491; B41J 2202/08; B41J 2202/13; B41J 2002/14362; B41J 2002/14419; B41J 2202/12; B41J 2202/19; B41J 2202/20; B41J 2/14233
See application file for complete search history.

(56) References Cited

U.S. PATENT DOCUMENTS

2018/0170038 A1* 6/2018 Matsumoto .......... B41J 2/04588

FOREIGN PATENT DOCUMENTS

JP 2018-099835 A 6/2018

* cited by examiner

*Primary Examiner* — Lisa Solomon
(74) *Attorney, Agent, or Firm* — Harness, Dickey & Pierce, P.L.C.

(57) ABSTRACT

A liquid ejecting head includes an introduction portion for introducing a gas supplied, a discharge portion for discharging the gas, and drive circuits provided in each of head chips, in which the drive circuits include a first drive circuit for driving the first head chip and a second drive circuit for driving the second head chip, a gas path through which the gas flows from the introduction portion to the discharge portion includes a first path coupled to the introduction portion, a second path coupled to the discharge portion, a first branch path coupling the first path and the second path, and a second branch path coupling the first path and the second path so as not to pass through the first branch path, the first drive circuit is disposed in the first branch path, and the second drive circuit is disposed in the second branch path.

17 Claims, 18 Drawing Sheets

LIQUID EJECTING HEAD AND LIQUID EJECTING APPARATUS

The present application is based on, and claims priority from JP Application Serial Number 2022-083631, filed May 23, 2022, the disclosure of which is hereby incorporated by reference herein in its entirety.

BACKGROUND

1. Technical Field

The present disclosure relates to a liquid ejecting head and a liquid ejecting apparatus.

2. Related Art

In the related art, a liquid ejecting apparatus that forms an image on a medium by ejecting liquid such as ink onto a medium such as printing paper based on image data indicating an image has been known. For example, in JP-A-2018-99835, a liquid ejecting apparatus having a plurality of head chips and a plurality of drive circuits for driving each of the plurality of head chips and in which the drive circuit with the largest heat generation amount among the plurality of drive circuits is disposed closest to an intake port is disclosed. By disposing the drive circuit having the largest heat generation amount closest to the intake port, the drive circuit having the largest heat generation amount can be efficiently cooled.

However, depending on the image indicated by the image data, the heat generation amount of the drive circuit disposed closest to the intake port is not always larger than the heat generation amount of the other drive circuits. Therefore, in the above-described liquid ejecting head described in the related art, there is a concern that the plurality of drive circuits cannot be uniformly cooled.

SUMMARY

A liquid ejecting head according to a preferred aspect of the present disclosure includes: a plurality of head chips that eject liquid in an ejection direction; one or a plurality of introduction portions for introducing a gas supplied from a gas supply mechanism into an inside of the liquid ejecting head; a discharge portion for discharging the gas supplied to the one or the plurality of introduction portions to an outside of the liquid ejecting head; and a plurality of drive circuits provided in each of the plurality of head chips, in which the plurality of head chips include a first head chip and a second head chip, the plurality of drive circuits include a first drive circuit for driving the first head chip and a second drive circuit for driving the second head chip, a gas path through which the gas flows from the one or the plurality of introduction portions to the discharge portion includes a first path coupled to the one or the plurality of introduction portions, a second path coupled to the discharge portion, a first branch path coupling the first path and the second path, and a second branch path coupling the first path and the second path so as not to pass through the first branch path, the first drive circuit is disposed in the first branch path, and the second drive circuit is disposed in the second branch path.

A liquid ejecting apparatus according to another preferred aspect of the present disclosure including the liquid ejecting head according to the above-described aspect, and the gas supply mechanism that supplies the gas to the one or the plurality of introduction portions of the liquid ejecting head.

DESCRIPTION OF EXEMPLARY EMBODIMENTS

Figure 1:
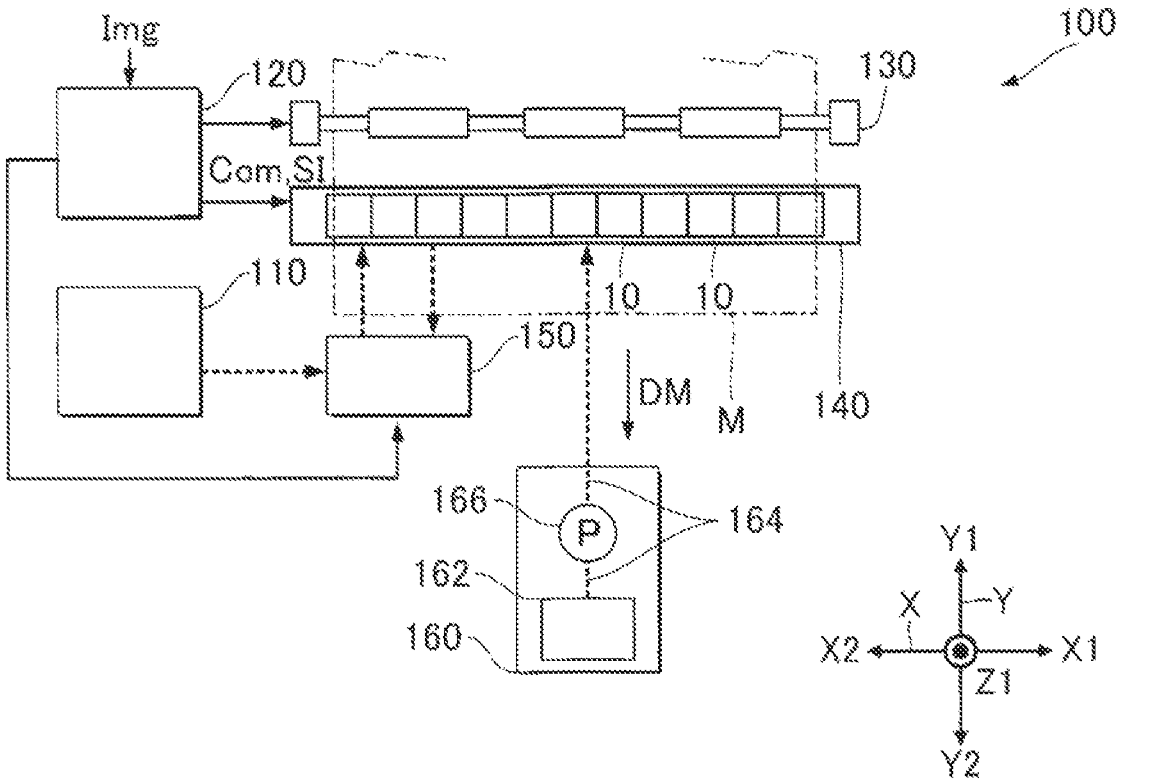
FIG. 1 is a schematic view exemplifying a liquid ejecting apparatus according to a first embodiment.

Hereinafter, preferred embodiments according to the present disclosure will be described with reference to the accompanying drawings. In the drawings, dimensions or scales of each portion are appropriately different from actual ones, and for easy understanding, some portions are schematically illustrated. In addition, the scope of the present disclosure is not limited to these forms unless it is stated in the following description that the present disclosure is particularly limited.

The following description will be given by appropriately using an X axis, a Y axis, and a Z axis which intersect with each other for convenience. In addition, one direction along the X axis is an X1 direction, and a direction opposite to the X1 direction is an X2 direction. Similarly, directions opposite to each other along the Y axis are a Y1 direction and a Y2 direction. In addition, directions opposite to each other along the Z axis are a Z1 direction and a Z2 direction.

1. First Embodiment

1-1. Liquid Ejecting Apparatus 100

FIG. 1 is a schematic view exemplifying a liquid ejecting apparatus 100 according to a first embodiment. The liquid ejecting apparatus 100 is an ink jet type printing apparatus that ejects ink which is an example of liquid onto a medium M as a droplet. The liquid ejecting apparatus 100 of the present embodiment is a so-called line type printing apparatus in which a plurality of nozzles N for ejecting the ink are distributed over the entire range in a width direction of the medium M. The medium M is typically printing paper. The medium M is not limited to the printing paper, and may be, for example, a printing target made of any material such as a resin film or cloth.

As illustrated in FIG. 1, the liquid ejecting apparatus 100 includes a liquid container 110, a control unit 120, a transport mechanism 130, a liquid ejecting module 140, a circulation mechanism 150, and a gas supply mechanism 160.

The liquid container 110 is a container that stores the ink. For example, specific aspects of the liquid container 110 include a cartridge attachable to and detachable from the liquid ejecting apparatus 100, a bag-shaped ink pack formed of a flexible film, and an ink tank replenishable with the ink. The type of the ink stored in the liquid container 110 is optional.

Although not illustrated in the drawing, the liquid container 110 of the present embodiment includes a first liquid container and a second liquid container. The first liquid container stores a first ink. The second liquid container stores a second ink having a type different from that of the first ink. For example, the first ink and the second ink have different colors from each other. The first ink and the second ink may be the same type of ink.

The control unit 120 controls an operation of each element of the liquid ejecting apparatus 100. The control unit 120 includes, for example, one or a plurality of processing circuits such as a CPU or an FPGA, and one or a plurality of storage circuits such as a semiconductor memory. The CPU is an abbreviation of a central processing unit. The FPGA is an abbreviation of a field programmable gate array. Various programs and various data are stored in the storage circuit. The processing circuit realizes various controls by executing the programs and using the data as appropriate.

The transport mechanism 130 transports the medium M in a direction DM under control of the control unit 120. The direction DM of the present embodiment is the Y2 direction. In an example illustrated in FIG. 1, the transport mechanism 130 includes a long transport roller along the X axis and a motor that rotates the transport roller. The transport mechanism 130 is not limited to the configuration using the transport roller, and may be configured to use, for example, a drum or an endless belt that transports the medium M in a state in which the medium M is attracted to an outer peripheral surface by electrostatic force or the like.

Under the control of the control unit 120, the liquid ejecting module 140 ejects the ink supplied from the liquid container 110 via the circulation mechanism 150 onto the medium M in the Z2 direction from each of the plurality of nozzles N. The Z2 direction is an example of the "ejection direction". In addition, the Z2 direction of the present embodiment is a vertical direction. Meanwhile, the Z2 direction and the vertical direction may be different. The liquid ejecting module 140 is a line head having a plurality of the liquid ejecting heads 10 disposed such that the plurality of nozzles N are distributed throughout the entire range of the medium M in a direction of the X axis. That is, the group of the plurality of liquid ejecting heads 10 constitutes a long line head extending in a direction along the X axis. The plurality of nozzles N included in one liquid ejecting head 10 may be disposed so as to be distributed throughout the entire range of the medium M in the direction along the X axis. In such a case, for example, the liquid ejecting module 140 is constituted of the one liquid ejecting head 10.

The liquid container 110 is coupled to the liquid ejecting module 140 via the circulation mechanism 150. The circulation mechanism 150 supplies the ink to the liquid ejecting module 140 under the control of the control unit 120, and recovers the ink discharged from the liquid ejecting module 140 in order to resupply the ink to the liquid ejecting module 140. The circulation mechanism 150 has, for example, a sub tank that stores the ink, a flow path for supplying the ink from the sub tank to the liquid ejecting module 140, a flow path for recovering the ink from the liquid ejecting module 140 to the sub tank, and a pump for appropriately flowing the ink. The sub tank, the flow path for supplying the ink, the flow path for recovering the ink, and the pump are provided for each container of the first liquid container and second liquid container described above. By the operation of the circulation mechanism 150 as described above, it is possible to suppress an increase in viscosity of the ink and reduce retention of bubbles in the ink.

The control unit 120 controls an ejection operation of the liquid ejecting head 10. Specifically, the control unit 120 receives image data Img indicating an image from a host computer such as a personal computer or a digital camera. Based on the received image data Img, the control unit 120 supplies a drive signal Com for driving the liquid ejecting head 10 and a control signal SI for controlling the liquid ejecting head 10 to the liquid ejecting head 10. Then, the liquid ejecting head 10 is driven by the drive signal Com under the control of the control signal SI, and ejects the ink in the Z2 direction from a part or all of the plurality of nozzles N provided in the liquid ejecting head 10. That is, the liquid ejecting head 10 ejects the ink from a part or all of the plurality of nozzles N in conjunction with the transport of the medium M by the transport mechanism 130, and causes the ejected ink to land on the surface of the medium M, thereby forming a desired image on the surface of the medium M. The nozzles N will be described later with reference to FIGS. 4 and 5.

Since the gas supply mechanism 160 supplies gas to the liquid ejecting head 10, more specifically, the gas supply mechanism 160 is a mechanism for cooling a drive circuit 18*i*, which will be described later. The gas supply mechanism 160 includes a gas storage portion 162 that stores the gas, a gas supply tube 164 for supplying the gas stored in the gas storage portion 162, and a pump 166 for adjusting a supply amount of the gas.

The type of gas supplied by the gas supply mechanism 160 is not particularly limited, and for example, it is preferable to use air, an inert gas such as nitrogen or argon, or the like. Furthermore, as for the type of gas supplied by the gas supply mechanism 160, the amount of water vapor is preferably 4 $g/m^3$ or less, more preferably 3 $g/m^3$ or less, and most preferably 1 $g/m^3$ or less.

The gas storage portion 162 includes an adjusting device for adjusting a temperature of the gas stored inside. The adjusting device includes, for example, a temperature sensor that detects a temperature of the gas in the gas storage portion 162, a cooling mechanism that cools the temperature inside the gas storage portion 162, and a control device that drives the cooling mechanism so that the temperature of the gas inside the gas storage portion 162 is a desired temperature based on the temperature detected by the temperature sensor. However, the gas storage portion 162 may not have an adjusting device.

The gas supply tube 164 has a plurality of branched portions branched to the number of liquid ejecting heads 10. One end of the gas supply tube 164 is coupled to the gas storage portion 162, and each end portion of the plurality of branched portions is coupled to each of the plurality of liquid ejecting heads 10. The gas supply mechanism 160 is air-tightly coupled to the liquid ejecting head 10 via the gas supply tube 164 so that foreign matter such as ink mist or paper dust does not infiltrate the inside of the liquid ejecting head 10.

The pump 166 is provided between the gas supply tubes 164. The pump 166 adjusts the supply amount of the gas supplied to the liquid ejecting head 10 under the control of the control unit 120.

1-2. Liquid Ejecting Module 140

Figure 2:
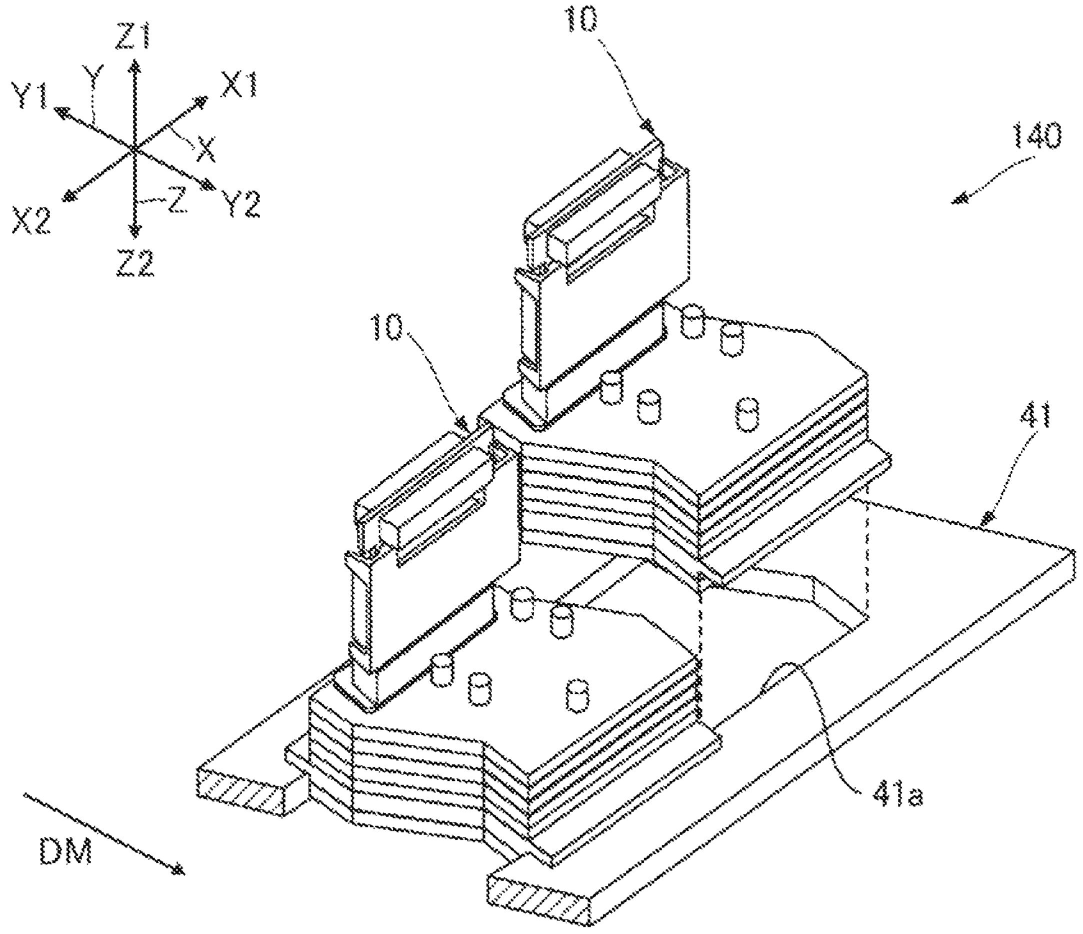
FIG. 2 is a perspective view of a liquid ejecting module having a liquid ejecting head according to an embodiment.

FIG. 2 is a perspective view of the liquid ejecting module 140 having the liquid ejecting head 10 according to the embodiment. As illustrated in FIG. 2, the liquid ejecting module 140 has a support body 41 and a plurality of liquid ejecting heads 10. The support body 41 is a member that supports the plurality of liquid ejecting heads 10. In an example illustrated in FIG. 2, the support body 41 is a plate-shaped member made of metal or the like, and is provided with mount holes 41*a* for mounting the plurality of liquid ejecting heads 10. The plurality of liquid ejecting heads 10 are inserted into the mount holes 41*a* in a state of being lined up in a direction along the X axis. Each liquid ejecting head 10 is fixed to the support body 41 by screwing or the like. FIG. 2 illustrates two liquid ejecting heads 10 as a representative. The number of liquid ejecting heads 10 in the liquid ejecting module 140 is optional. In addition, the shape of the support body 41 and the like are not limited to the example illustrated in FIG. 2, and are optional.

1-3. Liquid Ejecting Head 10

Figure 3:
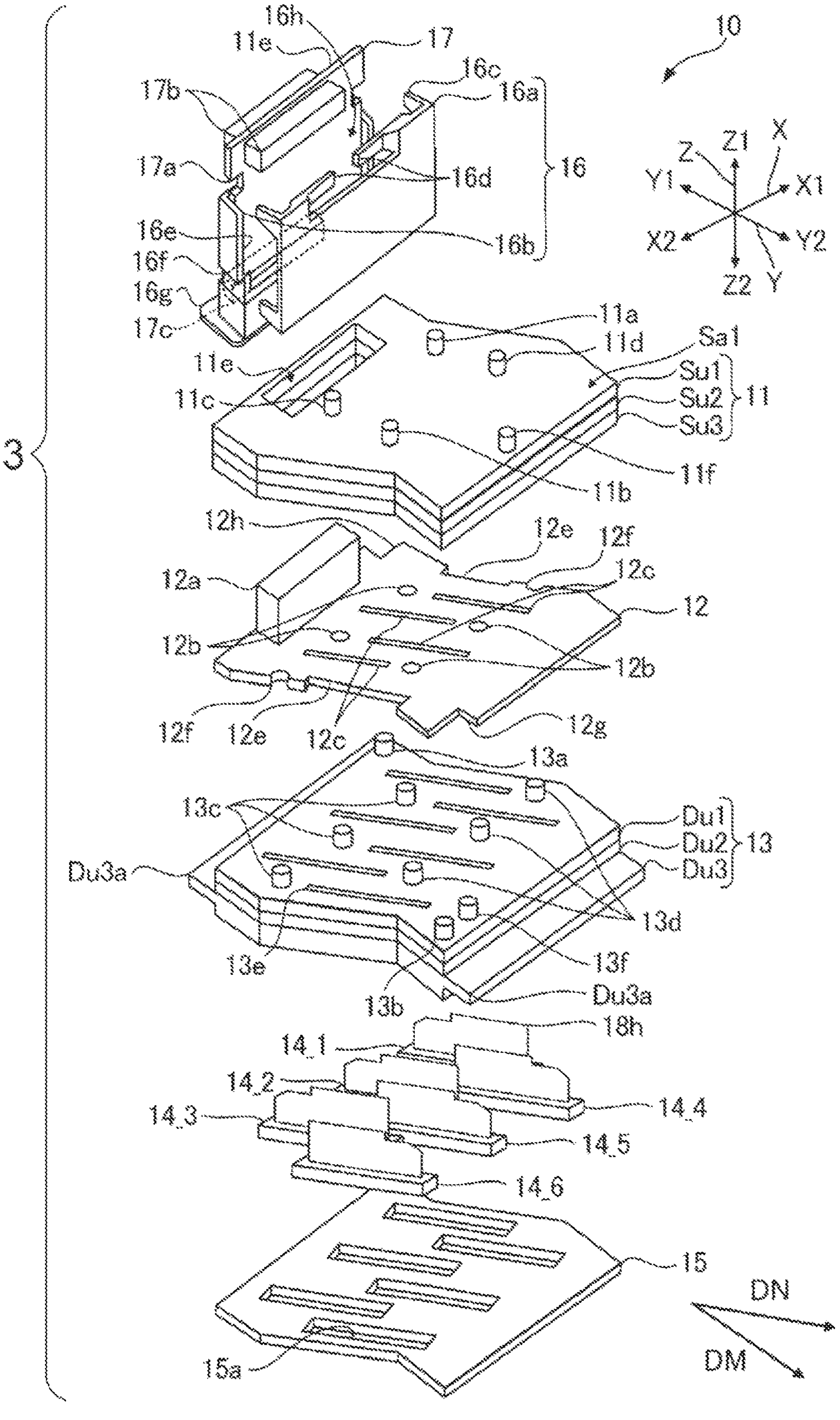
FIG. 3 is an exploded perspective view of the liquid ejecting head illustrated in FIG. 2.

FIG. 3 is an exploded perspective view of the liquid ejecting head 10 illustrated in FIG. 2. As illustrated in FIG. 3, the liquid ejecting head 10 has a filter unit 11, a head substrate 12, a holder unit 13, a plurality of head chips 14_1, 14_2, 14_3, 14_4, 14_5, and 14_6, a fixing plate 15, a protective case 16, and a connector substrate 17. These are disposed in the order of the connector substrate 17, the protective case 16, the filter unit 11, the head substrate 12, the holder unit 13, the plurality of head chips 14_1, 14_2, 14_3, 14_4, 14_5, and 14_6, and the fixing plate 15 in the Z2 direction. Each element of the liquid ejecting head 10 is fixed by an adhesive, screwing, or the like. Hereinafter, each portion of the liquid ejecting head 10 will be described in sequence. In the following, each of the head chips 14_1, 14_2, 14_3, 14_4, 14_5, and 14_6 may be described as a head chip 14. In the first embodiment, the liquid ejecting head 10 has six head chips 14, but the number is not limited to six, and any number of liquid ejecting heads 10 may be provided as long as there are two or more.

In the following description, a component of the head chip 14_*x* may be represented by adding a subscript "_x" as a reference numeral for representing the component. x is an integer from 1 to 6. The holder unit 13 is an example of a "first member". The filter unit 11 is an example of a "second member". The head substrate 12 is an example of a "first relay substrate". The connector substrate 17 is an example of a "second relay substrate". Head chips 14_1, 14_2, 14_3, 14_4, 14_5, and 14_6 are examples of "plurality of head chips".

The filter unit 11 is a structure in which a flow path for flowing the ink between the circulation mechanism 150 and the plurality of head chips 14 are provided inside the filter unit 11. The filter unit 11 has a filter plate Su1, a filter plate Su2, and a filter plate Su3. The filter plate Su3, the filter plate Su2, and the filter plate Su1 are stacked in this order in the Z1 direction. As illustrated in FIG. 3, a coupling tube 11*a*, a coupling tube lib, a coupling tube 11*c*, a coupling tube 11*d*, a hole 11*e*, and a coupling tube 11*f* are provided on a surface Sal of the filter plate Su1 facing the Z1 direction. The surface Sal is an example of a "first surface". By inserting the coupling tube 11*f* into an opening formed at a tip of the gas supply tube 164, it is possible to suppress the infiltration of ink mist and paper dust floating in the liquid ejecting head 10 into a gas path AP in the liquid ejecting head 10, which will be described later.

Here, although not illustrated in FIG. 3, inside the filter unit 11, a plurality of flow paths for flowing the ink and a part of a communication portion C1 which is a part of the paths for flowing the gas supplied from the gas supply mechanism 160 are provided. The communication portion C1 will be described later in FIG. 6. In the present specification, the path through which the ink flows is described as a "flow path", and the path through which the gas supplied from the gas supply mechanism 160 flows is described as a "path". The plurality of flow paths through which the ink flows inside the filter unit 11 are flow paths such as a first supply flow path CC1, a second supply flow path CC2, a first discharge flow path CM1, and a second discharge flow path CM2. The first supply flow path CC1 is a flow path for supplying the first ink to the plurality of head chips 14. The second supply flow path CC2 is a flow path for supplying the second ink to the plurality of head chips 14. A filter for capturing foreign matter and the like is installed in the middle of each of the supply flow paths. The first discharge flow path CM1 is a flow path through which the first ink is discharged from the plurality of head chips 14. The second discharge flow path CM2 is a flow path through which the second ink is discharged from the plurality of head chips 14. The flow path and the path of the filter unit 11 will be described with reference to FIGS. 7 and 15 which will be described later.

The coupling tubes 11*a*, 11*b*, 11*c*, 11*d*, and 11*f* are tube bodies protruding in the Z1 direction. More specifically, the coupling tube 11*a* is a tube body that constitutes a flow path through which the first ink is supplied to the first supply flow path CC1. In addition, the coupling tube 11*b* is a tube body that constitutes a flow path through which the second ink is supplied to the second supply flow path CC2. Meanwhile, the coupling tube 11*c* is a tube body that constitutes a flow path through which the first ink is discharged from the first discharge flow path CM1. In addition, the coupling tube 11*d* is a tube body that constitutes a flow path through which the second ink is discharged from the second discharge flow path CM2. The coupling tube 11*f* is a tube body that introduces the gas supplied from the gas supply mechanism 160 into the inside of the liquid ejecting head 10. The hole 11*e* is a hole for inserting a connector 12*a* which will be described later.

In the first embodiment, the tube body into which the gas supplied from the gas supply mechanism 160 is introduced is only one of the coupling tube 11*f*, but a plurality of the tube bodies that introduce the gas supplied from the gas supply mechanism 160 may be provided on the surface Sal. However, the number of tube bodies into which the gas supplied from the gas supply mechanism 160 is introduced is preferably smaller than the number of head chips 14 included in the liquid ejecting head 10. The opening of the coupling tube 11*f* is an example of "one or a plurality of introduction portions". In addition, the openings of the coupling tubes 11*a* and 11*b* are examples of "a liquid introduction portion for introducing the liquid into the inside of the liquid ejecting head".

The head substrate 12 is a mount component that electrically couples the plurality of head chips 14 and a connector substrate 17 which will be described later. The head substrate 12 is, for example, a rigid wiring substrate. The head substrate 12 is disposed between the filter unit 11 and the holder unit 13, and the connector 12*a* is installed on a surface of the head substrate 12 facing the filter unit 11. The connector 12*a* is a coupling component coupled to a connector substrate 17 which will be described later. In addition, the head substrate 12 is provided with four holes 12*b*, four through holes 12*c*, two notches 12*e*, two notches 12*f*, a notch 12*g*, and a notch 12*h*. Each of the four holes 12*b* is a hole for causing coupling between the filter unit 11 and the holder unit 13. Each of the two notches 12*f*, the notch 12*g*, and the notch 12*h* are also notches for causing coupling between the filter unit 11 and the holder unit 13. Each of the four through holes 12*c* is a hole into which a wiring substrate 18*h* coupling the head chip 14 and the head substrate 12 is inserted. The wiring substrate 18*h* is also inserted into a space formed by each of the two notches 12*e*. The liquid ejecting head 10 has four wiring substrates 18*h* inserted into each of the four through holes 12*c*, and two wiring substrates 18*h* inserted into the space formed by each of the two notches 12*e*. Even when the wiring substrate 18*h* is inserted into the through hole 12*c*, the through hole 12*c* is not blocked. These six wiring substrates 18*h* are coupled to a surface of the head substrate 12 facing the Z1 direction. The wiring substrate 18*h* is a member including wiring that is electrically coupled to a piezoelectric element 14*e* which will be described later.

The holder unit 13 is a structure that accommodates and supports the plurality of head chips 14. The holder unit 13 is made of, for example, a resin material, a metal material, or the like. The holder unit 13 has a flow path plate Du1, a flow path plate Du2, and a holder Du3. The holder Du3, the flow path plate Du2, and the flow path plate Du1 are stacked in this order in the Z1 direction. The holder unit 13 is provided with six through holes 13*e* that penetrate along the Z axis. Furthermore, a coupling tube 13*a*, a coupling tube 13*b*, three coupling tubes 13*c*, three coupling tubes 13*d*, and a coupling tube 13*f* are provided on a surface of the flow path plate Du1 facing the Z1 direction. The holder Du3 is provided with a flange Du3*a* for fixing the liquid ejecting head 10 to the support body 41. In addition, although not illustrated in the drawing, a plurality of recessed portions that accommodate the plurality of head chips 14 are provided on a surface of the holder unit 13 facing the Z2 direction.

In the present embodiment, the holder unit 13 holds six head chips 14_1 to 14_6. These head chips 14 are arranged in the X2 direction in the order of head chips 14_1, 14_4, 14_2, 14_5, 14_3, and 14_6. Here, the head chips 14_1 to 14_3 are disposed at positions shifted in the Y1 direction with respect to the head chips 14_4 to 14_6. However, the head chips 14_1 to 14_6 have portions that overlap each other as viewed in the X1 direction or the X2 direction. The arrangement directions DN of the plurality of nozzles N which will be described later in the head chips 14_1 to 14_6 are parallel to each other. Furthermore, each of the head chips 14_1 to 14_6 is disposed such that the arrangement direction DN is inclined with respect to the direction DM which is the transport direction of the medium M.

Here, although not illustrated, inside the holder unit 13, a first distribution supply flow path, a second distribution supply flow path, a plurality of first individual discharge flow paths, a plurality of second individual discharge flow paths, and a plurality of bypass flow paths BP, and a part of the path for flowing the gas from the gas supply mechanism 160 are provided. The first distribution supply flow path is a flow path having a branch through which the first ink is supplied to the plurality of head chips 14. The second distribution supply flow path is a flow path having a branch through which the second ink is supplied to the plurality of head chips 14. The first individual discharge flow path is provided for each head chip 14 that discharges the first ink, and is a flow path for introducing the first ink discharged from the head chip 14 into the first discharge flow path CM1 of the filter unit 11. The second individual discharge flow path is provided for each head chip 14 that discharges the second ink, and is a flow path for introducing the second ink discharged from the head chip 14 into the second discharge flow path CM2 of the filter unit 11. The two bypass flow paths BP are provided for each head chip 14, and are bypass flow paths through which a first common liquid chamber R1 communicates with a second common liquid chamber R2 which will be described later. The path of the holder unit 13 will be described with reference to FIGS. 7, 11, and 12 which will be described later.

The coupling tubes 13*a*, 13*b*, 13*c*, 13*d*, and 13*f* are tubular protrusions protruding from the surface Sal in the Z1 direction. More specifically, the coupling tube 13*a* is a tube body that constitutes a flow path for supplying the first ink to the first distribution supply flow path of the holder unit 13, and communicates with the first supply flow path CC1 of the filter unit 11. In addition, the coupling tube 13*b* is a tube body that constitutes a flow path for supplying the second ink to the second distribution supply flow path of the holder unit 13, and communicates with the second supply flow path CC2 of the filter unit 11. Meanwhile, the coupling tube 13*c* is a tube body that constitutes a flow path through which the first ink is discharged from the first individual discharge flow path, and communicates with the first discharge flow path CM1 of the filter unit 11. In addition, the coupling tube 13*d* is a tube body that constitutes a flow path through which the second ink is discharged from the second individual discharge flow path, and communicates with the second discharge flow path of the filter unit 11. The wiring substrate 18*h* that couples the head chip 14 and the head substrate 12 is inserted into the through hole 13*e*. Even when the wiring substrate 18*h* is inserted into the through hole 13*e*, the through hole 13*e* is not blocked. The coupling tube 13*f* is a tube body that constitutes a path for supplying the gas to the communication portion C1, and communicates with the communication portion C1 of the filter unit 11.

Each head chip 14 ejects the ink. Specifically, although not illustrated in FIG. 3, each head chip 14 has the plurality of nozzles N for ejecting the first ink or the second ink. The nozzles N are provided on a nozzle surface FN, which is a surface of each head chip 14 facing the Z2 direction. Details of the head chip 14 will be described with reference to FIG. 4, which will be described later.

The fixing plate 15 is a plate member for fixing the plurality of head chips 14 to the holder unit 13. Specifically, the fixing plate 15 is disposed in a state in which the plurality of head chips 14 are sandwiched between the fixing plate 15 and the holder unit 13, and is fixed to the holder unit 13 with an adhesive. The fixing plate 15 is made of, for example, a metal material. The fixing plate 15 is provided with a plurality of openings 15*a* for exposing the nozzles N of the plurality of head chips 14. In an example illustrated in FIG. 3, the plurality of openings 15*a* are individually provided for each head chip 14.

The protective case 16 is a member for protecting the connector substrate 17 and for fixing the connector substrate 17 to the filter unit 11. The protective case 16 is made of, for example, a resin material. The protective case 16 has a member 16*a* and a member 16*b*. The member 16*a* is a substantially flat plate member extending in the XZ plane. A claw 16*c* extending in the Y1 direction for attachment to the member 16*b* is provided in the vicinity of each of the four vertices of the member 16*a*. Furthermore, the member 16*a* is provided with a pressing member 16*d* that presses the connector substrate 17. When the member 16*a* is attached to the member 16*b*, a through hole 16*h* that penetrates the protective case 16 along the Z axis is formed in the protective case 16.

The member 16*b* is a substantially rectangular member having an opening penetrating the Z axis. A notch 16*e* for attaching the member 16*a* is provided on a surface of the member 16*b* facing the Y2 direction. Furthermore, notches 16*f* into which two claws 16*c* located in the Z2 direction among the four claws 16*c* of the member 16*a* are inserted are provided on the side surfaces of the member 16*b* in the X1 direction and the X2 direction. Furthermore, the member 16*b* is provided with a flange 16*g* to be fixed to the filter unit 11. The protective case 16 and the filter unit 11 are fixed to each other by inserting and screwing a screw into a hole (not illustrated) formed in the flange 16*g* and a screw hole (not illustrated) formed in the surface Sa1 of the filter unit 11.

The connector substrate 17 is a mount component that electrically couples the control unit 120 and the head substrate 12 described above. The connector substrate 17 is, for example, a rigid wiring substrate. The connector substrate 17 is inserted into the through hole 16*h*. Even the connector substrate 17 is inserted into the through hole 16*h*, the through hole 16*h* is not blocked. Notches 17*a* into which two claws 16*c* located in the Z1 direction among the four claws 16*c* of the member 16*a* are inserted are provided on the side surfaces of the connector substrate 17 in the X1 direction and the X2 direction. Furthermore, connectors 17*b* to be coupled with the control unit 120 are provided at an end portion of the surface of the connector substrate 17 facing the Y1 direction in the Z1 direction and at an end portion of the surface of the connector substrate 17 facing the Y2 direction in the Z1 direction. In addition, a connector 17*c* to be coupled to the connector 12*a* is provided at an end portion of the surface of the connector substrate 17 facing the Y1 direction in the Z2 direction.

1-4. Head Chip 14

Figure 4:
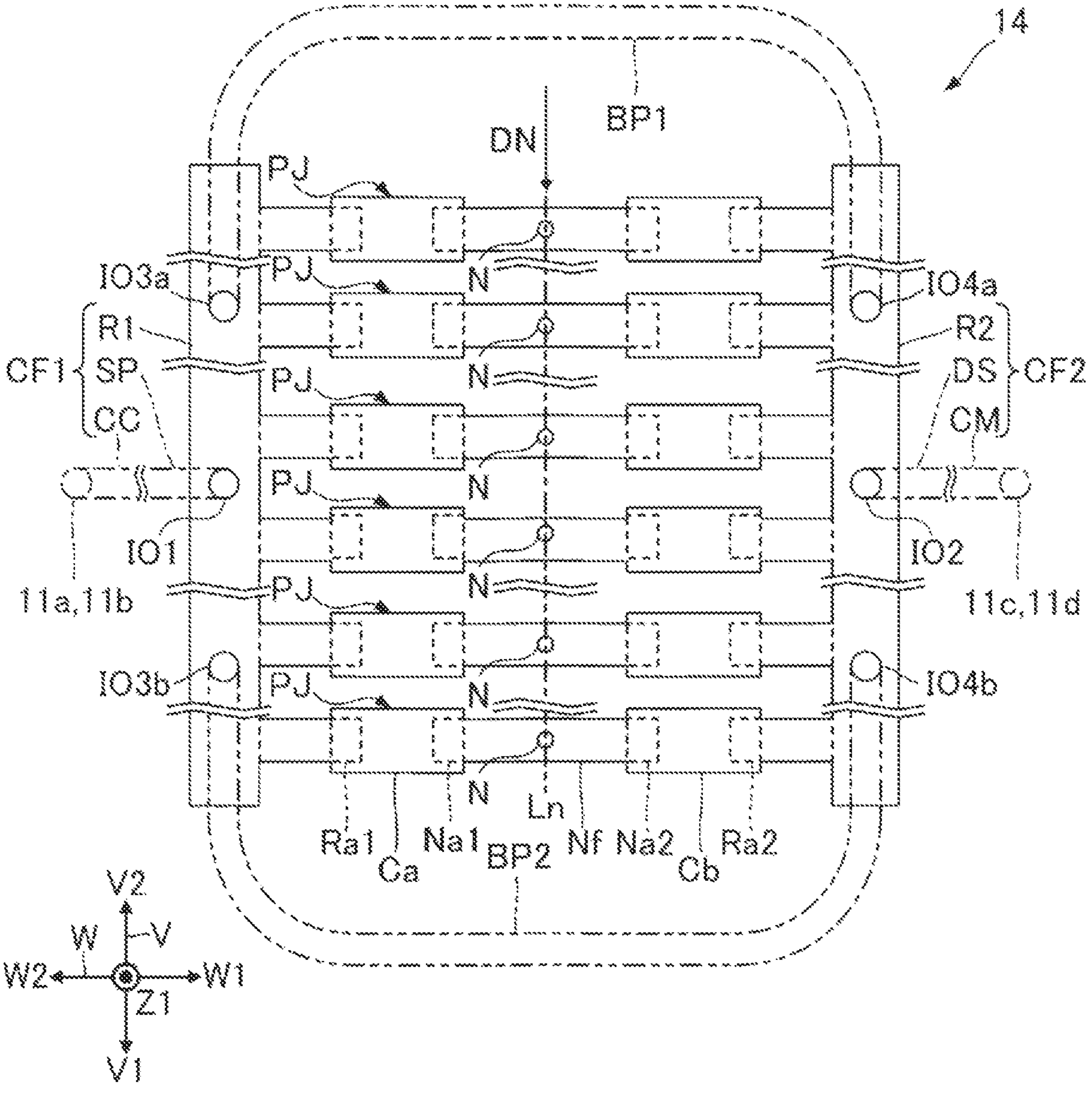
FIG. 4 is a plan view schematically illustrating a flow path of a head chip included in the liquid ejecting head.

FIG. 4 is a plan view schematically illustrating a flow path of the head chip 14 included in the liquid ejecting head 10. The following description will be given by appropriately using a V axis and a W axis in addition to the X axis, the Y axis, and the Z axis for convenience. In addition, one direction along the V axis is a V1 direction, and a direction opposite to the V1 direction is a V2 direction. Similarly, the directions opposite to each other along the W axis are a W1 direction and a W2 direction.

Here, the V axis is an axis along an arrangement direction DN of the plurality of nozzles N which will be described later, and is an axis that is obtained by rotating the Y axis around the Z axis at a predetermined angle. The W axis is an axis that is obtained by rotating the X axis around the Z axis at the predetermined angle. Therefore, the V axis and the W axis are typically orthogonal to each other, but are not limited to this, and may intersect at an angle within a range of, for example, 80° or more and 100° or less. In addition, the predetermined angle, that is, the angle which is formed by the V axis and the Y axis, or the angle which is formed by the W axis and the X axis is, for example, within a range of 40° or more and 60° or less.

As illustrated in FIG. 4, the head chip 14 is provided with the plurality of nozzles N, a plurality of individual flow paths PJ, the first common liquid chamber R1, and the second common liquid chamber R2. Here, the first common liquid chamber R1 and the second common liquid chamber R2 communicate with each other via the plurality of individual flow paths PJ. In addition, as illustrated by a chain double-dashed line in FIG. 4, the bypass flow paths BP1 and BP2 are coupled to the first common liquid chamber R1 and the second common liquid chamber R2. Hereinafter, the bypass flow paths BP1 and BP2 may be collectively referred to as "bypass flow path BP". The bypass flow paths BP1 and BP2 are flow paths that bypass the plurality of individual flow paths PJ and through which the first common liquid chamber R1 communicates with the second common liquid chamber R2, and are provided in the holder unit 13.

The head chip 14 has a surface facing the medium M, and as illustrated in FIG. 4, the plurality of nozzles N are provided on the surface. The plurality of nozzles N are arranged along the V axis. Each of the plurality of nozzles N ejects the ink in the Z2 direction.

Here, a set of the plurality of nozzles N constitutes a nozzle row Ln. In addition, the plurality of nozzles N are arranged at equal intervals at a predetermined pitch. The predetermined pitch is a distance between the centers of the plurality of nozzles N in the direction along the V axis.

The individual flow path PJ communicates with each of the plurality of nozzles N. Each of the plurality of individual flow paths PJ extends along the W axis and communicates with the nozzles N that are different from each other. The plurality of individual flow paths PJ are arranged along the V axis.

As illustrated in FIG. 4, each individual flow path PJ has a pressure chamber Ca, a pressure chamber Cb, a nozzle flow path Nf, an individual supply flow path Ra1, an individual discharge flow path Ra2, a first communication flow path Na1, and a second communication flow path Na2.

Each of the pressure chamber Ca and the pressure chamber Cb in each individual flow path PJ extends along the W axis and is a space in which the ink ejected from the nozzle N communicating with the individual flow path PJ is stored. In an example illustrated in FIG. 4, a plurality of the pressure chambers Ca are arranged along the V axis. Similarly, a plurality of the pressure chambers Cb are arranged along the V axis. In each individual flow path PJ, positions of the pressure chamber Ca and the pressure chamber Cb in the direction along the V axis are the same in the example illustrated in FIG. 4, but may be different from each other. In the following, when the pressure chamber Ca and the pressure chamber Cb are not particularly distinguished, each pressure chamber may be referred to as "pressure chamber C".

The nozzle flow path Nf is disposed between the pressure chamber Ca and the pressure chamber Cb in each individual flow path PJ. Here, the pressure chamber Ca communicates with the nozzle flow path Nf via the first communication flow path Na1 which extends along the Z axis. The pressure chamber Cb communicates with the nozzle flow path Nf via the second communication flow path Na2 which extends along the Z axis.

In each individual flow path PJ, the nozzle flow path Nf is a space which extends along the W axis. In addition, the plurality of nozzle flow paths Nf are arranged along the V axis at intervals from each other. The nozzle N is provided in each nozzle flow path Nf. In each nozzle flow path Nf, the ink is ejected from the nozzle N by changing the pressure in the pressure chamber Ca and the pressure chamber Cb described above.

Each of the first communication flow path Na1 and the second communication flow path Na2 is a space which extends along the Z axis. The first communication flow path Na1 and the second communication flow path Na2 may be provided as necessary, and may be removed.

The first common liquid chamber R1 and the second common liquid chamber R2 communicate with the plurality of individual flow paths PJ. Here, the pressure chamber Ca communicates with the first common liquid chamber R1 via the individual supply flow path Ra1 which extends along the Z axis. The pressure chamber Cb communicates with the second common liquid chamber R2 via the individual discharge flow path Ra2 which extends along the Z axis.

Each of the first common liquid chamber R1 and the second common liquid chamber R2 is a space which extends along the V axis throughout the entire range in which the plurality of nozzles N are distributed. Here, the first common liquid chamber R1 is coupled to an end of each individual flow path PJ in the W2 direction. The first common liquid chamber R1 stores the ink for supplying to each individual flow path PJ. Meanwhile, the second common liquid chamber R2 is coupled to an end of each individual flow path PJ in the W1 direction. The second common liquid chamber R2 stores the ink discharged from each individual flow path PJ without being ejected.

The first common liquid chamber R1 is provided with a supply port IO1, a discharge port IO3*a*, and a discharge port IO3*b*. The supply port IO1 is a tube path for introducing the ink from the distribution supply flow path SP of the holder unit 13 into the first common liquid chamber R1. The discharge port IO3*a* is a tube path for discharging the ink from the first common liquid chamber R1 to the bypass flow path BP1. The discharge port IO3*b* is a tube path for discharging the ink from the first common liquid chamber R1 to the bypass flow path BP2.

Here, the distribution supply flow path SP is coupled to the circulation mechanism 150 via the supply flow path CC of the filter unit 11. Therefore, a flow path from the coupling tube 11*a* or the coupling tube 11*b* to the first common liquid chamber R1 is commonly provided for the plurality of pressure chambers C, and constitutes a common supply flow path CF1 through which the ink is supplied to the plurality of individual flow paths PJ. The supply flow path CC is a first supply flow path CC1 or a second supply flow path CC2 which will be described later. In addition, although not illustrated in FIG. 4, the common supply flow path CF1 includes not only the first common liquid chamber R1, the distribution supply flow path SP, and the supply flow path CC, but also a first filter chamber RF1 or a second filter chamber RF2 which will be described later.

The second common liquid chamber R2 is provided with a discharge port 102, an introduction port IO4*a*, and an introduction port IO4*b*. The discharge port 102 is a tube path for discharging the ink from the second common liquid chamber R2 to an individual discharge flow path DS of the holder unit 13. The introduction port IO4*a* is a tube path for introducing the ink from the bypass flow path BP1 to the second common liquid chamber R2. The introduction port IO4*b* is a tube path for introducing the ink from the bypass flow path BP2 into the second common liquid chamber R2.

Here, the individual discharge flow path DS is coupled to the circulation mechanism 150 via the discharge flow path CM of the filter unit 11. Therefore, a flow path from the second common liquid chamber R2 to the coupling tube 11*a* or the coupling tube 11*b* is commonly provided for the plurality of pressure chambers C, and constitutes a common discharge flow path CF2 through which the ink is discharged from the plurality of individual flow paths PJ. The discharge flow path CM is the first discharge flow path CM1 or the second discharge flow path CM2 which will be described later.

Figure 5:
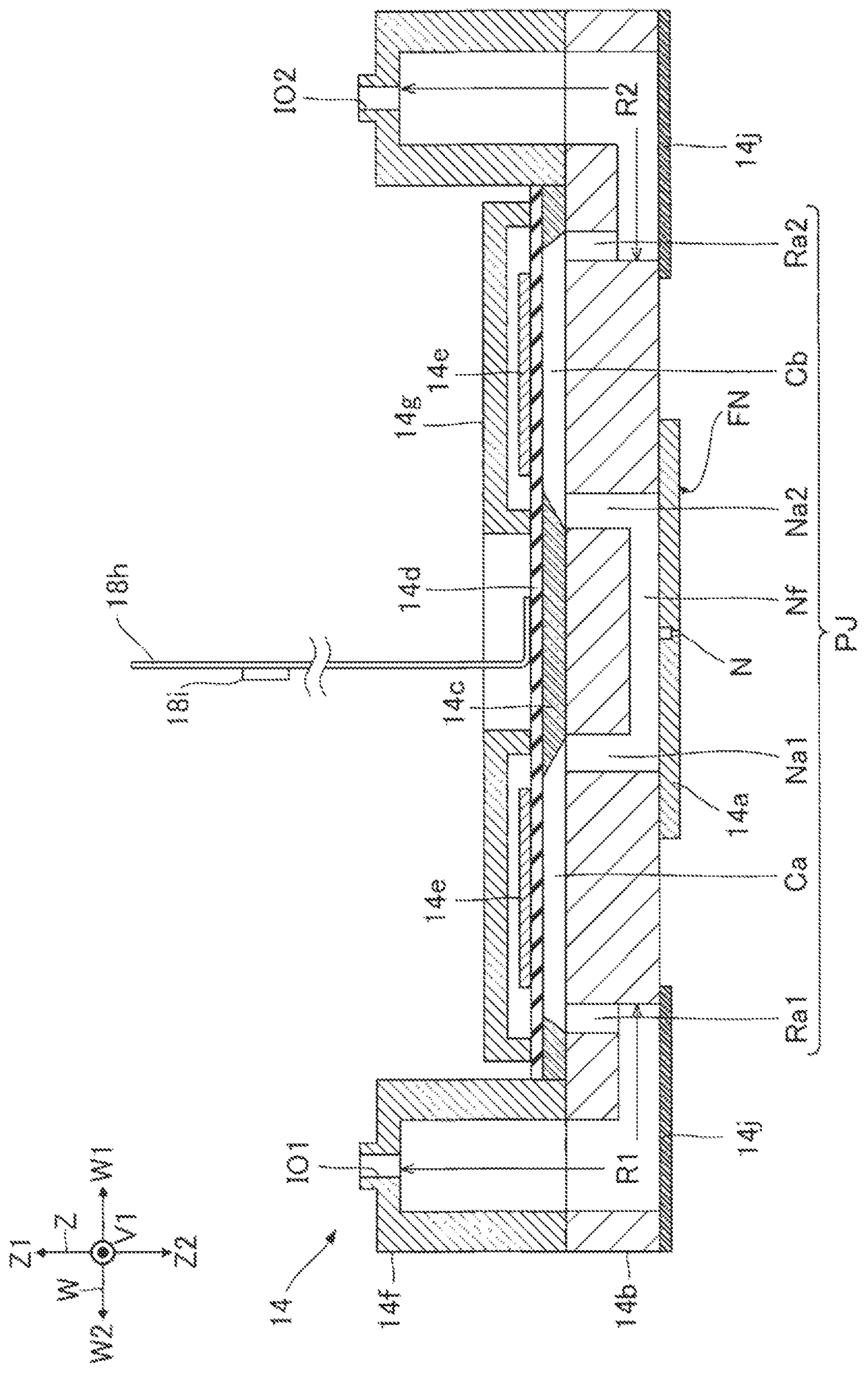
FIG. 5 is a cross-sectional view of the head chip included in the liquid ejecting head.

FIG. 5 is a cross-sectional view of the head chip 14 included in the liquid ejecting head 10. In FIG. 5, in addition to the head chip 14, the wiring substrate 18*h* is also displayed. FIG. 5 illustrates a cross section of the head chip 14 which is cut in a plane including the W axis and the Z axis. As illustrated in FIG. 5, the head chip 14 has a nozzle substrate 14*a*, a flow path substrate 14*b*, a pressure chamber substrate 14*c*, a vibration plate 14*d*, a plurality of piezoelectric elements 14*e*, a case 14*f*, and a protective plate 14*g*.

The nozzle substrate 14*a*, the flow path substrate 14*b*, the pressure chamber substrate 14*c*, and the vibration plate 14*d* are laminated in this order in the Z1 direction. Each of the members extends along the V axis and is manufactured, for example, by processing a silicon single crystal substrate using a semiconductor processing technique. The members are bonded to each other by an adhesive or the like. It should be noted that another layer such as an adhesive layer or a substrate may be appropriately interposed between two adjacent members among the members.

The plurality of nozzles N are provided on the nozzle substrate 14*a*. Each of the plurality of nozzles N penetrates the nozzle substrate 14*a* and is a through hole through which the ink passes. The plurality of nozzles N are arranged in the direction along the V axis.

The flow path substrate 14*b* is provided with a part of each of the first common liquid chamber R1 and the second common liquid chamber R2 and a portion of the plurality of individual flow paths PJ excluding the pressure chamber Ca and the pressure chamber Cb. That is, the flow path substrate 14*b* is provided with the nozzle flow path Nf, the first communication flow path Na1, the second communication flow path Na2, the individual supply flow path Ra1, and the individual discharge flow path Ra2.

A part of each of the first common liquid chamber R1 and the second common liquid chamber R2 is a space for penetrating the flow path substrate 14*b*. A vibration absorbing body 14*j* that blocks the opening by the space is installed on the surface of the flow path substrate 14*b* facing the Z2 direction.

The vibration absorbing body 14*j* is a layered member made of an elastic material. The vibration absorbing body 14*j* forms a part of a wall surface of each of the first common liquid chamber R1 and the second common liquid chamber R2, and absorbs the pressure fluctuation in the first common liquid chamber R1 and the second common liquid chamber R2.

The nozzle flow path Nf is a space in a groove provided on a surface of the flow path substrate 14*b* facing the Z2 direction. Here, the nozzle substrate 14*a* constitutes a part of the wall surface of the nozzle flow path Nf.

Each of the first communication flow path Na1 and the second communication flow path Na2 is a space for penetrating the flow path substrate 14*b*.

Each of the individual supply flow path Ra1 and the individual discharge flow path Ra2 is a space for penetrating the flow path substrate 14*b*. The individual supply flow path Ra1 causes the first common liquid chamber R1 to communicate with the pressure chamber Ca so as to supply the ink from the first common liquid chamber R1 to the pressure chamber Ca. Here, one end of the individual supply flow path Ra1 is opened on a surface of the flow path substrate 14*b* facing the Z1 direction. On the other hand, the other end of the individual supply flow path Ra1 is an upstream end of the individual flow path PJ and is opened to the wall surface of the first common liquid chamber R1 in the flow path substrate 14*b*. On the other hand, the individual discharge flow path Ra2 causes the second common liquid chamber R2 to communicate with the pressure chamber Cb so as to discharge the ink from the pressure chamber Cb to the second common liquid chamber R2. Here, one end of the individual discharge flow path Ra2 is opened on the surface of the flow path substrate 14*b* facing the Z1 direction. On the other hand, the other end of the individual discharge flow path Ra2 is a downstream end of the individual flow path PJ, and is opened to the wall surface of the second common liquid chamber R2 in the flow path substrate 14*b*.

The pressure chamber substrate 14*c* is provided with the pressure chambers Ca and the pressure chambers Cb of the plurality of individual flow paths PJ. Each of the pressure chamber Ca and the pressure chamber Cb penetrates the pressure chamber substrate 14*c* and is a gap between the flow path substrate 14*b* and the vibration plate 14*d*.

The vibration plate 14*d* is a plate-shaped member which can elastically vibrate. The vibration plate 14*d* is a laminate including, for example, a first layer made of silicon oxide ($SiO_2$) and a second layer made of zirconium oxide ($ZrO_2$). Here, another layer such as a metal oxide may be interposed between the first layer and the second layer. A part or all of the vibration plate 14*d* may be integrally made of the same material as the pressure chamber substrate 14*c*. For example, the vibration plate 14*d* and the pressure chamber substrate 14*c* can be integrally formed by selectively removing a part in a thickness direction of the region corresponding to the pressure chamber C in the plate-shaped member having a predetermined thickness. In addition, the vibration plate 14*d* may be constituted of a layer of a single material.

The plurality of piezoelectric elements 14*e* corresponding to the pressure chambers C different from each other are installed on a surface of the vibration plate 14*d* facing the Z1 direction. Each piezoelectric element 14*e* is configured by, for example, laminating a first electrode and a second electrode facing each other and a piezoelectric layer disposed between the two electrodes. Each piezoelectric element 14*e* fluctuates the pressure of the ink in the pressure chamber C to eject the ink in the pressure chamber C from the nozzle N. When the drive signal Com is supplied, the piezoelectric element 14*e* vibrates the vibration plate 14*d* with its own deformation. With the vibration, the pressure chamber C expands and contracts such that the pressure of the ink in the pressure chamber C fluctuates. The piezoelectric element 14*e* is an example of a "drive element". However, the head chip 14 may have a heat generating element instead of the piezoelectric element 14*e*.

The case 14*f* is a case that stores the ink. The case 14*f* is provided with a space constituting a remaining portion other than a part provided on the flow path substrate 14*b* for each of the first common liquid chamber R1 and the second common liquid chamber R2. The drive circuit 18*i* is disposed outside the case 14*f*.

The protective plate 14*g* is a plate-shaped member installed on the surface of the vibration plate 14*d* facing the Z1 direction, protects the plurality of piezoelectric elements 14*e*, and reinforces the mechanical strength of the vibration plate 14*d*. Here, a space for accommodating the plurality of piezoelectric elements 14*e* is formed between the protective plate 14*g* and the vibration plate 14*d*.

The wiring substrate 18*h* is mounted on the surface of the vibration plate 14*d* facing the Z1 direction, and is a mount component that electrically couples the control unit 120 and the head chip 14. The wiring substrate 18*h* is formed of, for example, a flexible substrate such as an FPC. When the wiring substrate 18*h* is the FPC, the wiring substrate 18*h* constitutes a COF together with the drive circuit 18*i*. The FPC is an abbreviation of flexible printed circuits. The COF is an abbreviation of a chip on film. The drive circuit 18*i* for driving the head chip 14 is mounted on the wiring substrate 18*h*.

The drive circuit 18*i* is an integrated circuit including a switching element that can select whether or not to supply the drive signal Com for driving the piezoelectric element 14*e* for ejecting the ink. Specifically, the switching element selects to supply the drive signal Com to the piezoelectric element 14*e* when the control signal SI supplied from the control unit 120 is a signal that instructs the piezoelectric element 14*e* to be driven. In addition, the switching element selects not to supply the drive signal Com to the piezoelectric element 14*e* when the control signal SI supplied from the control unit 120 is a signal that instructs the piezoelectric element 14*e* not to be driven.

In the head chip 14 having the above-described configuration, the ink flows to the first common liquid chamber R1, the individual supply flow path Ra1, the pressure chamber Ca, the nozzle flow path Nf, the pressure chamber Cb, and the individual discharge flow path Ra2 and the second common liquid chamber R2, in this order, by the operation of the circulation mechanism 150 described above.

The pressure of the pressure chamber Ca and the pressure chamber Cb is caused to fluctuate by simultaneously driving the piezoelectric element 14*e* corresponding to both the pressure chamber Ca and the pressure chamber Cb by the drive signal Com from the drive circuit 18*i*. Thereby, the ink is ejected from the nozzle N in accordance with the pressure fluctuation thereof.

1-5. Path in Liquid Ejecting Head 10

Figure 6:
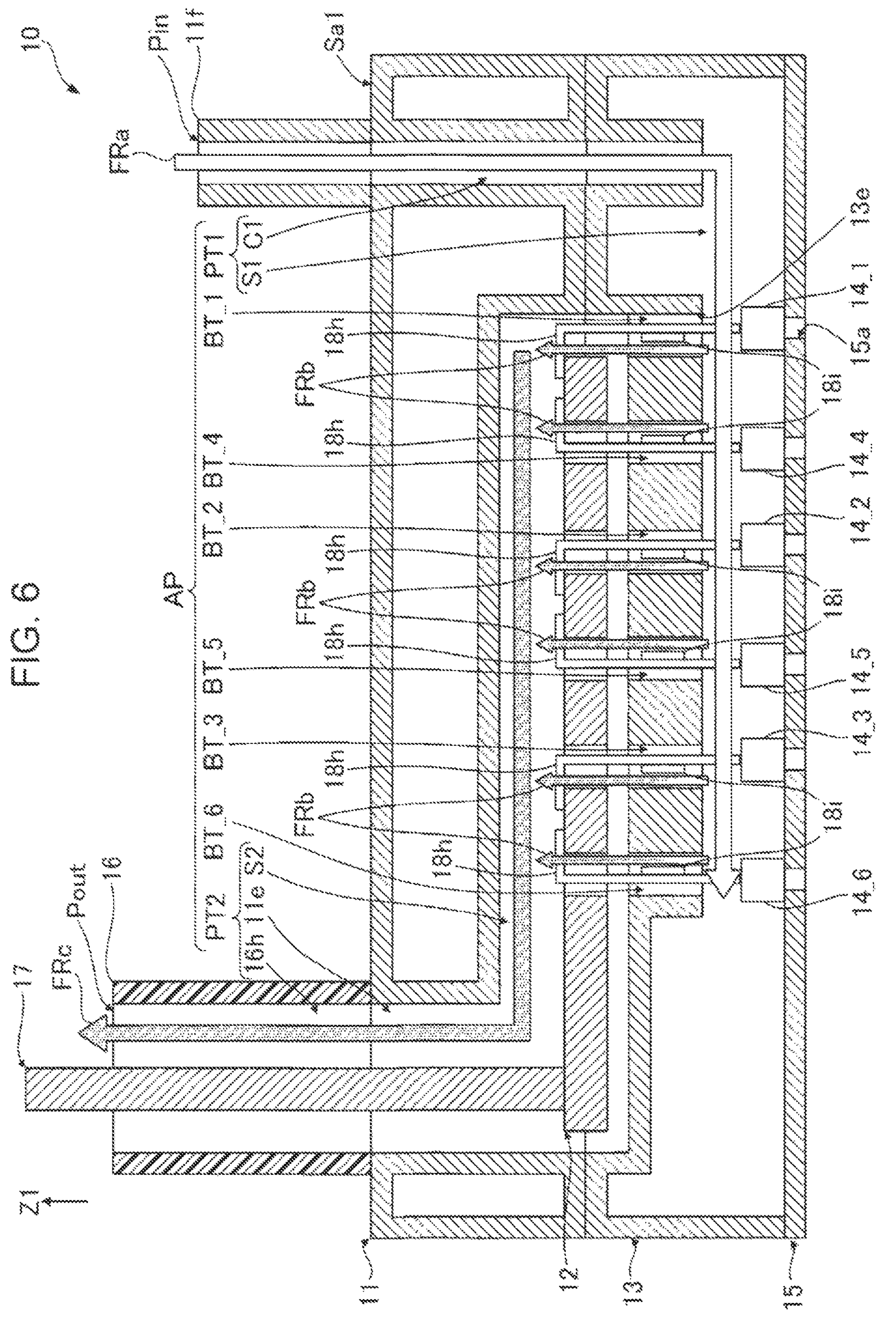
FIG. 6 is a view schematically illustrating a path in the liquid ejecting head.

FIG. 6 is a view schematically illustrating a path in the liquid ejecting head 10. In FIG. 6, for an easy description of the path, a positional relationship of each element in the liquid ejecting head 10 in a direction perpendicular to the Z axis and a direction of each element are appropriately changed, which are different from the original positional relationship of each element and the direction of each element.

The liquid ejecting head 10 has a gas path AP. The gas path AP is a path through which the gas supplied from the gas supply mechanism 160 flows from an introduction portion Pin which is an opening of the coupling tube 11*f* to a discharge portion Pout which is an opening of the protective case 16. As described above, the coupling tube 11*f* is provided on the surface Sal. Since the coupling tube 11*f* provided on the surface Sal defines the introduction portion Pin, it can be said that the introduction portion Pin is also provided on the surface Sal. The discharge portion Pout is a wiring opening formed on an outer wall of the liquid ejecting head 10. In FIG. 6, gas flows FRa, FRb, and FRc in the liquid ejecting head 10 are illustrated.

Providing the introduction portion Pin on the surface Sal is an example of "one or a plurality of introduction portions are provided on a first surface of a second member". "The one or the plurality of introduction portions are provided on the first surface of the second member" includes an aspect in which a member that defines the introduction portion is provided on the first surface of the second member as in the present embodiment, in addition to an aspect in which the introduction portion is directly provided on the first surface of the second member.

The gas supplied from the gas supply mechanism 160 is introduced into the introduction portion Pin. The discharge portion Pout discharges the gas to the outside of the liquid ejecting head 10 in the Z1 direction.

The gas path AP has a supply path PT1 coupled to the introduction portion Pin, a discharge path PT2 coupled to the discharge portion Pout, and a plurality of branch paths BT having the same number as the number of the plurality of head chips 14. In the first embodiment, the gas path AP has a branch path BT_1 corresponding to the head chip 14_1, a branch path BT_2 corresponding to the head chip 14_2, a branch path BT_3 corresponding to the head chip 14_3, a branch path BT_4 corresponding to the head chip 14_4, a branch path BT_5 corresponding to the head chip 14_5, and a branch path BT_6 corresponding to the head chip 14_6. In the following, each of the branch paths BT_1, BT_2, BT_3, BT_4, BT_5, and BT_6 may be described as a branch path BT. The branch path BT corresponding to the head chip 14 means a branch path BT into which the wiring substrate 18*h* to be coupled to the head chip 14 is inserted among the branch paths BT_1, BT_2, BT_3, BT_4, BT_5, and BT_6. The drive circuit 18*i* for driving the corresponding head chip 14 is disposed in each of the six branch paths BT.

In the first embodiment, the six branch paths BT and the six head chips 14 have a one-to-one correspondence with each other, but the present disclosure is not limited to this. For example, two wiring substrates 18*h* coupled to each of a plurality, for example, two head chips 14 may be inserted into one branch path BT among the plurality of branch paths BT. That is, when the number of the head chips 14 is six and the number of wiring substrates 18*h* corresponding to one branch path BT is two, three branch paths BT are provided.

The branch path BT is formed by a through hole provided in the flow path plate Du1, the flow path plate Du2, and the holder Du3 that form the holder unit 13. Each branch path BT of the six branch paths BT couples the supply path PT1 and the discharge path PT2 so as not to pass through the other branch paths BT. However, a slight gap may be formed between the flow path plate Du1 and the flow path plate Du2, and between the flow path plate Du2 and the holder Du3. That is, the adjacent branch paths BT may be communicated by the space between the flow path plate Du1 and the flow path plate Du2 and by the space between the flow path plate Du2 and the holder Du3. When the gap is narrow, the amount of gas flowing from one of the adjacent branch paths BT to the other via the gap is very small. Therefore, even though a slight gap is formed between the flow path plate Du1 and the flow path plate Du2, and between the flow path plate Du2 and the holder Du3, it may be regarded as "each branch path BT of the six branch paths BT couples the supply path PT1 and the discharge path PT2 so as not to pass through the other branch paths BT."

Here, in order to efficiently cool the drive circuit 18*i*, it is preferable that the inside of the liquid ejecting head 10 is sealed. In other words, it is preferable that all of the gas supplied from the introduction portion Pin is discharged from the discharge portion Pout, and it is not preferable that the gas is discharged from an opening other than the discharge portion Pout. Therefore, on the outer wall of the liquid ejecting head 10, it is preferable that no gap is formed between the fixing plate 15 and the holder unit 13, between the holder unit 13 and the filter unit 11, between the filter unit 11 and the protective case 16, between the filter plate Su1 and the filter plate Su2, between the filter plate Su2 and the filter plate Su3, between the flow path plate Du1 and the flow path plate Du2, and between the flow path plate Du2 and the holder Du3 by an adhesive or the like.

The supply path PT1 is an example of a "first path". The discharge path PT2 is an example of a "second path". Among the head chips 14_1, 14_2, 14_3, 14_4, 14_5, and 14_6, a head chip 14_*x* is an example of a "first head chip", a head chip 14_*y* is an example of a "second head chip", and a head chip 14_*z* is an example of a "third head chip". x, y, and z are integers from 1 to 6 and are different values. Furthermore, among the branch paths BT_1, BT_2, BT_3, BT_4, BT_5, and BT_6, a branch path BT_x is an example of a "first branch path", a branch path BT_y is an example of a "second branch path", and a branch path BT z is an example of a "third branch path". A drive circuit 18*i*_*x* for driving the head chip 14_*x* is an example of a "first drive circuit". A drive circuit 18*i*_*y* for driving the head chip 14_*y* is an example of a "second drive circuit". A drive circuit 18*i*_*z* for driving the head chip 14_*z* is an example of a "third drive circuit". A wiring substrate 18*h*_*x* coupled to the head chip 14_*x* is an example of a "first wiring substrate". A wiring substrate 18*h*_*y* coupled to the head chip 14_*y* is an example of a "second wiring substrate".

As illustrated in FIG. 6, the supply path PT1 includes a first accommodation space S1 that accommodates the six head chips 14, and a communication portion C1 through which the first accommodation space S1 communicates with the introduction portion Pin. Each of the six branch paths BT is coupled to the first accommodation space S1. The first accommodation space S1 is a space partitioned by a surface of the holder unit 13 and a surface of the fixing plate 15 facing the Z1 direction. Although not illustrated in FIG. 6, the communication portion C1 includes a portion extending in a direction orthogonal to the Z axis. Details of the communication portion C1 will be described later with reference to FIGS. 7 to 9.

The discharge path PT2 has a second accommodation space S2 that accommodates the head substrate 12, the hole 11*e*, and the through hole 16*h*. The second accommodation space S2 is a space partitioned by a surface of the filter unit 11 and a surface of the holder unit 13. The six branch paths BT are coupled to the second accommodation space S2. It can be said that the holder unit 13 is disposed between the first accommodation space S1 and the second accommodation space S2. As illustrated in FIG. 3, the holder unit 13 has six through holes 13*e*. Each of the six through holes 13*e* is the branch path BT. When the head chip 14_1 corresponds to the "first head chip", the through hole 13*e* into which the wiring substrate 18*h* coupled to the head chip 14_1 is inserted is an example of a "first through hole". When the head chip 14_2 corresponds to the "second head chip", the through hole 13*e* into which the wiring substrate 18*h* coupled to the head chip 14_2 is inserted is an example of a "second through hole".

As indicated by the flow FRa, the gas supplied from the gas supply mechanism 160 is introduced into the first accommodation space S1 via the introduction portion Pin and the communication portion C1. The flow FRa is indicated by a white arrow. In the following illustration, the white arrows mean the flow of the gas before being heated by the drive circuit 18*i*. As indicated by the flow FRb, the gas introduced into the first accommodation space S1 reaches the second accommodation space S2 via the branch path BT of any of the branch paths BT_1 to BT_6. When the gas passes through the branch path BT, the gas is blown into the drive circuit 18*i*, and heat exchange is performed between the drive circuit 18*i* disposed in the branch path BT and the gas. That is, the drive circuit 18*i* is cooled by the gas, and the gas is heated by the drive circuit 18*i*. The flow FRb is a flow from the Z2 direction to the Z1 direction. The flow FRb is indicated by an arrow that changes from white to shaded. The arrow that changes from white to shaded means that the gas is heated by the drive circuit 18*i* in the middle of the flow. As indicated by the flow FRc, the heated gas is discharged from the second accommodation space S2 in the Z1 direction via the hole 11*e*, the through hole 16*h*, and the discharge portion Pout. The flow FRc is indicated by a shaded arrow. The shaded arrow means the flow of the gas after being heated by the drive circuit 18*i*.

FIG. 6 illustrates an example in which all of the heated gas moves in a direction orthogonal to the Z axis at a position in the Z1 direction with respect to the head substrate 12, and moves in a space close to the introduction portion Pin with the connector substrate 17 as a reference in each of the hole 11*e*, the through hole 16*h*, and the discharge portion Pout, but the present disclosure is not limited to this. Specifically, a part of the heated gas may move in the direction orthogonal to the Z axis at a position in the Z2 direction with respect to the head substrate 12, and may move in a space far from the introduction portion Pin with the connector substrate 17 as a reference in each of the hole 11*e*, the through hole 16*h*, and the discharge portion Pout.

1-6. Communication Portion C1

Figure 7:
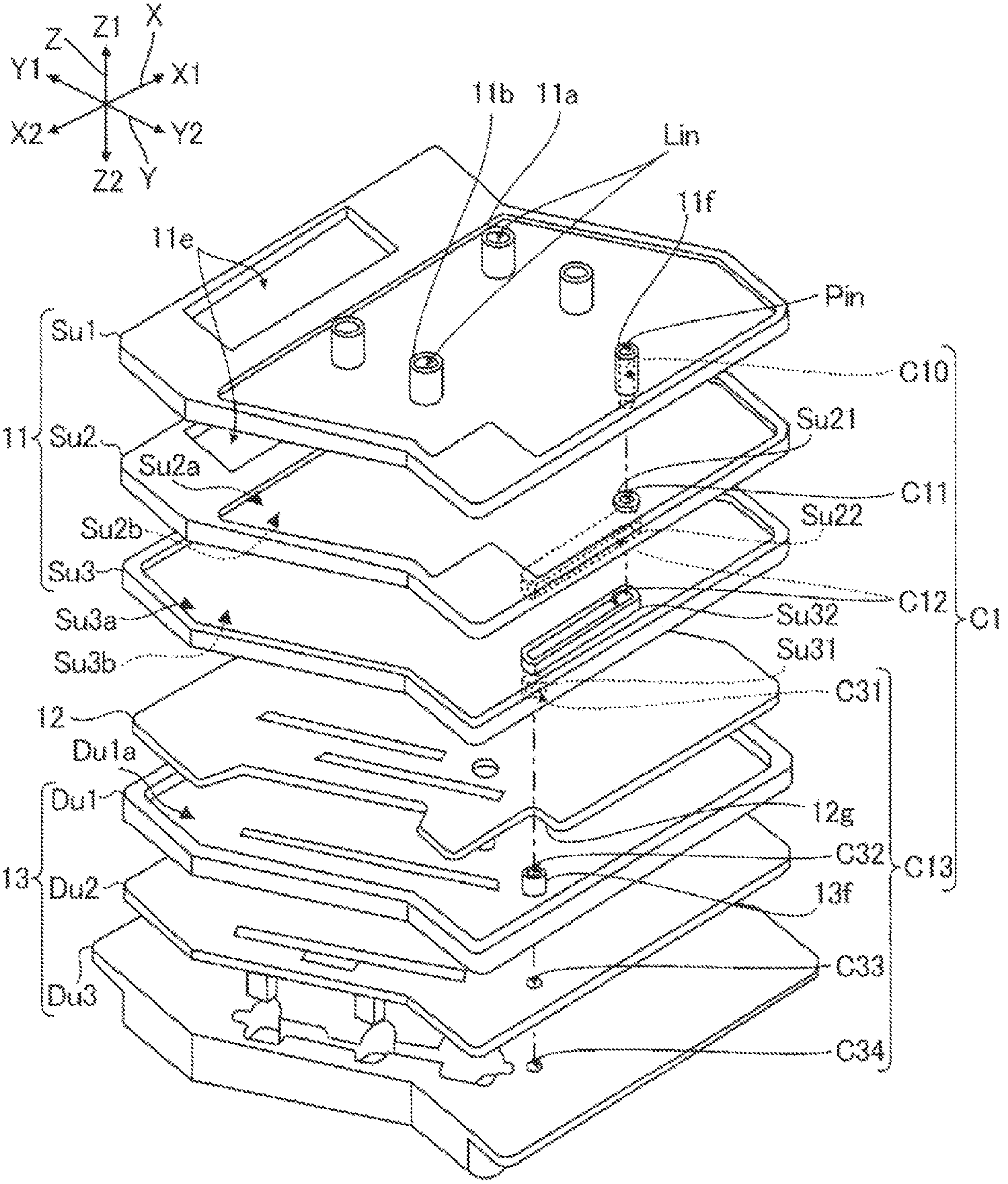
FIG. 7 is an exploded perspective view of a filter unit, a head substrate, and a holder unit.
Figure 8:
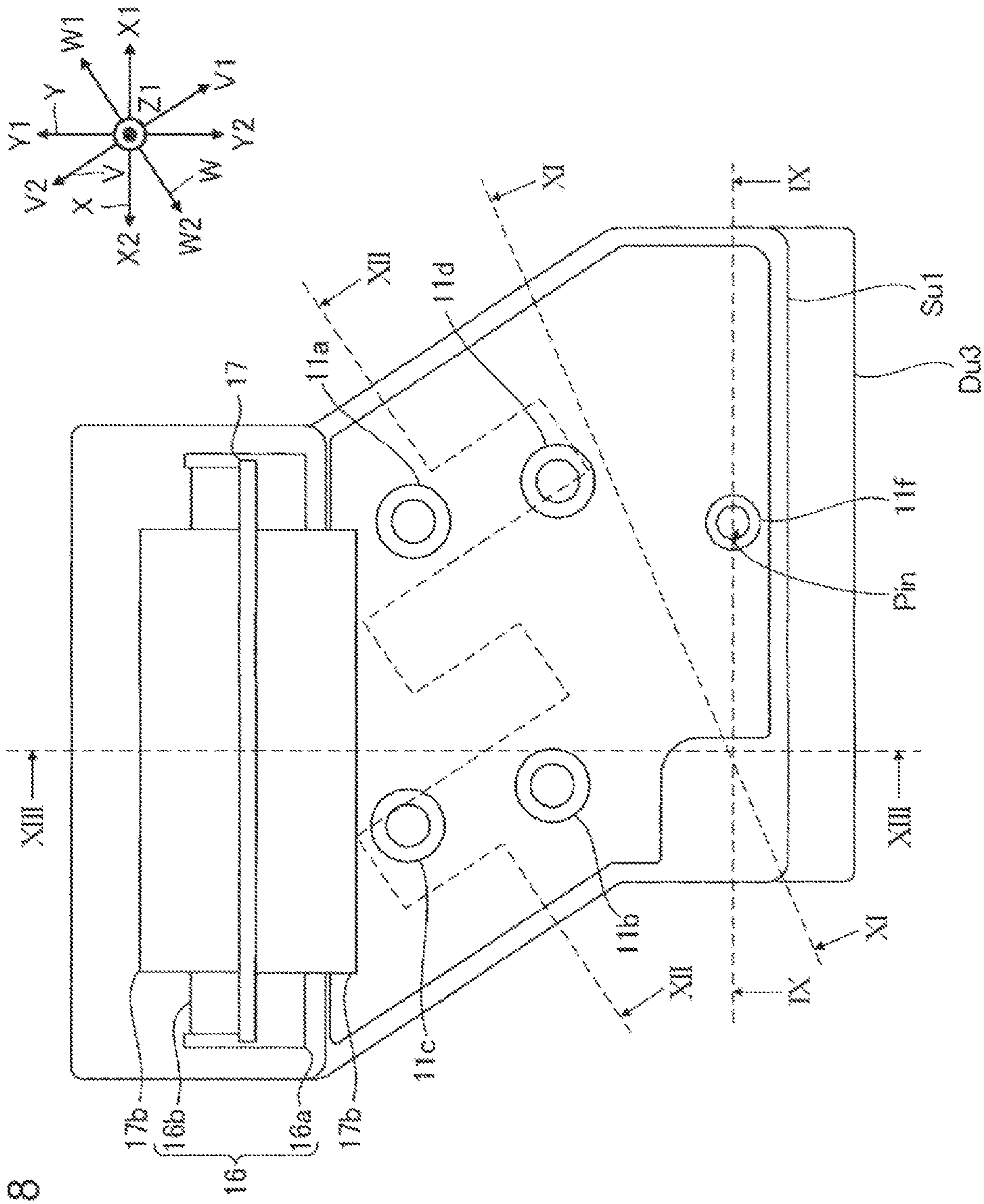
FIG. 8 is a plan view of the liquid ejecting head.
Figure 9:
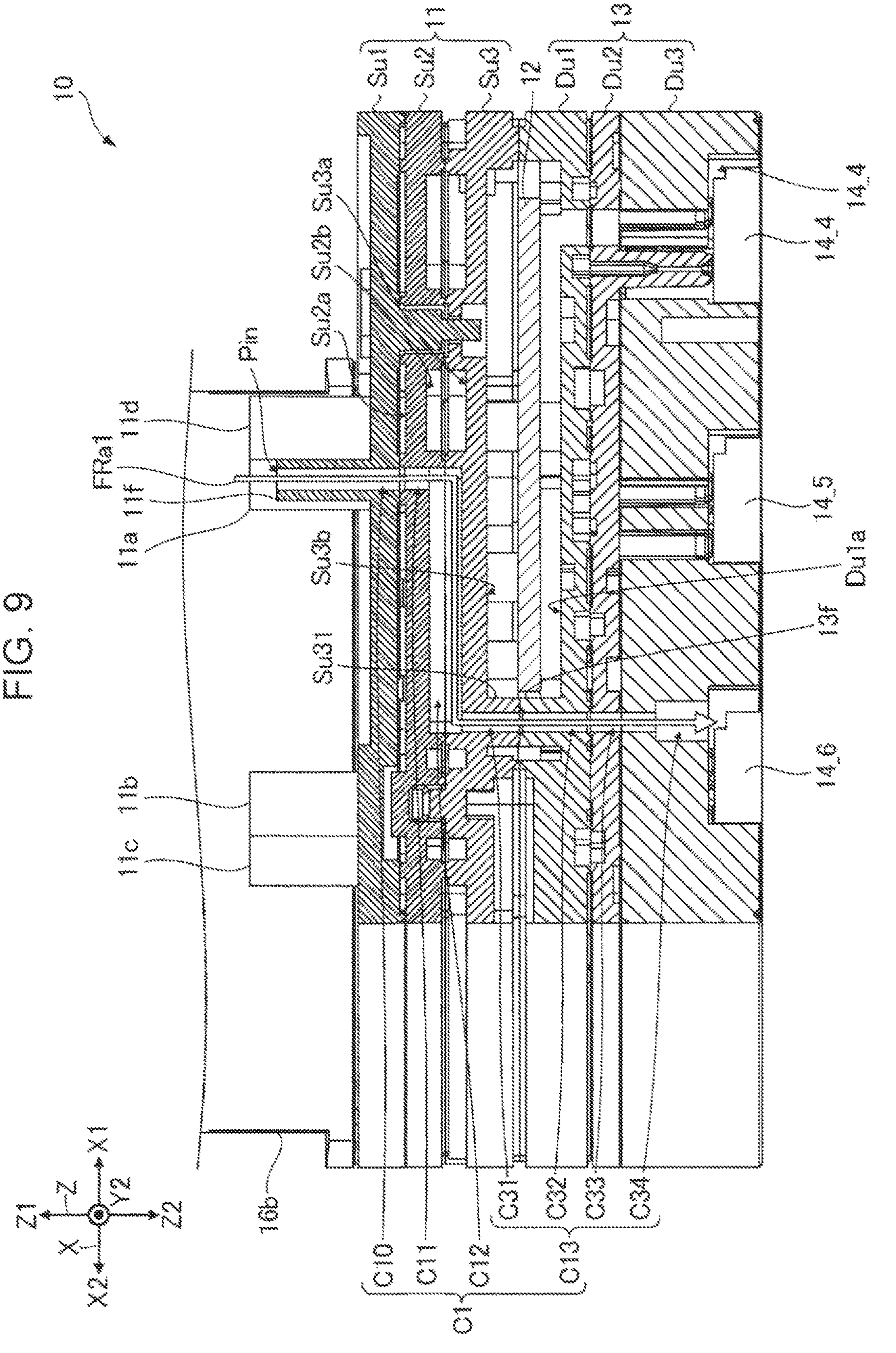
FIG. 9 is a cross-sectional view illustrating a cross section taken along the line IX-IX in FIG. 8.

The shape of the communication portion C1 will be described with reference to FIGS. 7 to 9. FIG. 7 is an exploded perspective view of the filter unit 11, the head substrate 12, and the holder unit 13. However, in FIG. 7, in order to prevent the drawing from being complicated, the shapes other than the communication portion C1 are omitted as appropriate. FIG. 8 is a plan view of the liquid ejecting head 10. It can be said that the plan view illustrated in FIG. 8 is a plan view of the liquid ejecting head 10 as viewed in the Z2 direction. Hereinafter, the plan view as viewed in the Z2 direction is simply referred to as a "plan view". FIG. 9 is a cross-sectional view illustrating a cross section taken along the line IX-IX in FIG. 8. The cross section taken along the line IX-IX is a cross section that passes through the coupling tube 11*f* and is parallel to the X axis and the Z axis. In addition, in FIG. 9, the cross sections of the head chips 14_4, 14_5, and 14_6 are not illustrated in order to prevent the drawing from being complicated. FIG. 9 illustrates a flow FRa1 of the gas flowing from the introduction portion Pin to the first accommodation space S1. The flow FRa1 is a part of the flow FRa illustrated in FIG. 6.

As illustrated in FIGS. 7 and 9, the communication portion C1 is provided inside the outer wall of the liquid ejecting head 10 in the Y2 direction. As illustrated in FIGS. 7 and 9, the communication portion C1 has a coupling tube portion C10, a first vertical portion C11, a horizontal portion C12, and a second vertical portion C13. The coupling tube portion C10, the first vertical portion C11, and the second vertical portion C13 extend along the Z axis. The coupling tube portion C10 is a space inside the coupling tube 11*f* and communicates with the introduction portion Pin which is an opening of the coupling tube 11*f*. The end portion of the first vertical portion C11 in the Z1 direction communicates with the coupling tube portion C10. The end portion of the first vertical portion C11 in the Z2 direction communicates with the end portion of the horizontal portion C12 in the X1 direction. The first vertical portion C11 is an opening of the filter plate Su2 along the Z axis.

As illustrated in FIG. 7, the openings of the coupling tubes 11*a* and 11*b* are liquid introduction portions Lin for introducing the ink into the inside of the liquid ejecting head 10.

As described above, the coupling tubes 11*a* and 11*b* are provided on the surface Sal. Since the coupling tubes 11*a* and 11*b* provided on the surface Sal define the liquid introduction portion Lin, it can be said that the liquid introduction portion Lin is also provided on the surface Sal.

Providing the liquid introduction portion Lin on the surface Sal is an example of "a liquid introduction portion for introducing the liquid into an inside of the liquid ejecting head is provided on the first surface of the second member". "The liquid introduction portion for introducing the liquid into an inside of the liquid ejecting head is provided on the first surface of the second member" includes an aspect in which a member that defines the liquid introduction portion is provided on the first surface of the second member as in the present embodiment, in addition to an aspect in which the liquid introduction portion is provided directly on the first surface of the second member.

As illustrated in FIGS. 7 and 9, a surface of the filter plate Su2 facing the Z1 direction has a recessed portion recessed in the Z2 direction, and a bottom portion Su2*a* is formed by the recessed portion. A coupling tube Su21 protruding in the Z1 direction is formed in the bottom portion Su2*a*. The coupling tube Su21 is provided with a through hole that penetrates the filter plate Su2. The through hole provided in the coupling tube Su21 is the first vertical portion C11.

The horizontal portion C12 extends along the X axis. The X axis is an example of a "direction orthogonal to the ejection direction". Therefore, the horizontal portion C12 may extend in the direction orthogonal to the Z axis and may extend in a direction intersecting the X axis. One end of the horizontal portion C12 in the X2 direction is coupled to the second vertical portion C13. In addition, the horizontal portion C12 is an example of "a portion extending in the direction orthogonal to the ejection direction" of the communication portion C1. The horizontal portion C12 of the present embodiment extends along the horizontal direction because the Z2 direction is the vertical direction, but when the Z2 direction, strictly speaking, the Z axis intersects the vertical direction, the horizontal portion C12 may extend in a direction different from the horizontal direction. The same applies to each of the coupling tube portion C10, the first vertical portion C11, and the second vertical portion C13. When the Z2 direction, strictly speaking, the Z axis intersects the vertical direction, the coupling tube portion C10, the first vertical portion C11, and the second vertical portion C13 may extend in a direction intersecting a direction perpendicular to a horizontal plane.

As illustrated in FIGS. 7 and 9, the horizontal portion C12 is formed of a surface of the filter plate Su3 and the filter plate Su2. As illustrated in FIGS. 7 and 9, a surface of the filter plate Su3 facing the Z1 direction has a recessed portion recessed in the Z2 direction, and a bottom portion Su3*a* is formed by the recessed portion. A wall body Su32 in the Z2 direction of the horizontal portion C12 protruding in the Z1 direction is formed in the bottom portion Su3*a*. As illustrated in FIGS. 7 and 9, a surface of the filter plate Su2 facing the Z2 direction has a recessed portion recessed in the Z1 direction, and a bottom portion Su2*b* is formed by the recessed portion. A wall body Su22 in the Z1 direction of the horizontal portion C12 protruding in the Z2 direction is formed in the bottom portion Su2*b*. The horizontal portion C12 is formed by bonding the surface of the wall body Su22 facing the Z2 direction and the surface of the wall body Su32 facing the Z1 direction.

The second vertical portion C13 has a portion C31, a portion C32, a portion C33, and a portion C34. As illustrated in FIGS. 7 and 9, an end portion of the portion C31 in the Z1 direction communicates with an end portion of the horizontal portion C12 in the X2 direction. An end portion of the portion C31 in the Z2 direction communicates with an end portion of the portion C32 in the Z1 direction. As illustrated in FIGS. 7 and 9, a surface of the filter plate Su3 facing the Z2 direction has a recessed portion recessed in the Z1 direction, and a bottom portion Su3*b* is formed by the recessed portion. A coupling tube Su31 protruding in the Z2 direction is formed in the bottom portion Su2*a*. The coupling tube Su31 is provided with a through hole that penetrates the filter plate Su3 and communicates with the horizontal portion C12. The through hole provided in the coupling tube Su31 is the portion C31.

As illustrated in FIGS. 7 and 9, an end portion of the portion C32 in the Z2 direction communicates with an end portion of the portion C33 in the Z1 direction. As illustrated in FIGS. 7 and 9, a surface of the flow path plate Du1 facing the Z1 direction has a recessed portion recessed in the Z2 direction, and a bottom portion Du1*a* is formed by the recessed portion. A coupling tube 13*f* protruding in the Z1 direction is formed in the bottom portion Du1*a*. The coupling tube 13*f* is provided with a through hole that penetrates the flow path plate Du1. The through hole provided in the coupling tube 13*f* is the portion C32. The coupling tube 13*f* penetrates a space formed by the notch 12*g* and is coupled to the portion C31.

As illustrated in FIGS. 7 and 9, an end portion of the portion C33 in the Z2 direction communicates with an end portion of the portion C34 in the Z1 direction. The flow path plate Du2 is provided with a through hole that penetrates the flow path plate Du2. This through hole is the portion C33.

As illustrated in FIG. 9, a surface of the holder Du3 facing the Z2 direction has a recessed portion recessed in the Z1 direction for accommodating the six head chips 14. The space formed by the recessed portion is the first accommodation space S1. The portion C34 is an end portion of the communication portion C1 in the Z1 direction. An end portion of the portion C34 in the Z2 direction communicates with the first accommodation space S1. The first accommodation space S1 will be described with reference to FIGS. 10 and 11.

Between the introduction portion Pin and the first vertical portion C11, between the first vertical portion C11 and the horizontal portion C12, between the horizontal portion C12 and the portion C31, between the portion C31 and the portion C32, between the portion C33 and the portion C34, and between the portion C34 and the first accommodation space S1 are each airtightly coupled by an adhesive or the like. That is, all of the gas introduced from the introduction portion Pin reaches the first accommodation space S1 via the communication portion C1.

1-7. First Accommodation Space S1

Figure 10:
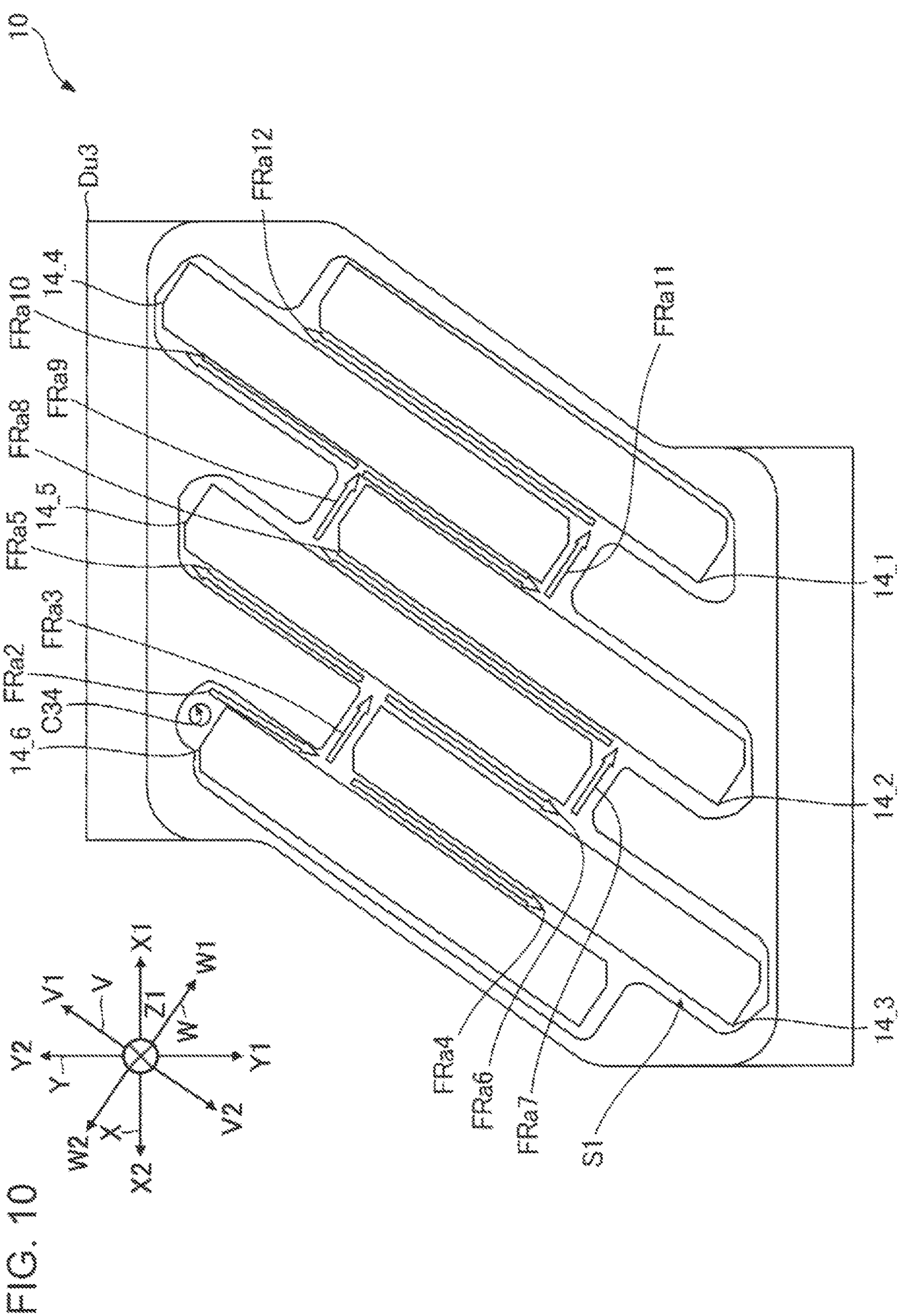
FIG. 10 is a bottom view of the liquid ejecting head when a fixing plate is not illustrated.

FIG. 10 is a bottom view of the liquid ejecting head 10 when the fixing plate 15 is not illustrated. FIG. 10 illustrates gas flows FRa2, FRa3, FRa4, FRa5, FRa6, FRa7, FRa8, FRa9, FRa10, FRa11, and FRa12 in the first accommodation space S1. The flows FRa2 to FRa12 are a part of the flow FRa illustrated in FIG. 6.

As understood from FIG. 10, in a plan view, the portion C34 does not overlap with the six head chips 14 and is provided in the vicinity of the head chip 14_6. The portion C34 is an example of the "end portion coupled to the first accommodation space of the communication portion".

The gas discharged from the portion C34 fills the first accommodation space S1. Specifically, the gas discharged from the portion C34 moves in the V2 direction along the outer wall of the head chip 14_6 in the W1 direction and reaches the outer wall of the head chip 14_3, as indicated by the flow FRa2. The flow FRa2 is branched into the flow FRa3 moving in the W1 direction and the flow FRa4 moving in the V2 direction. A part of the gas that reached the outer wall of the head chip 14_3 moves in the W1 direction along the outer wall of the head chip 14_3 in the V1 direction and reaches the outer wall of the head chip 14_5, as indicated by the flow FRa3.

The flow FRa3 is branched into the flow FRa5 moving in the V1 direction and the flow FRa6 moving in the V2 direction. A part of the gas that reached the outer wall of the head chip 14_5 moves in the W1 direction along the outer wall of the head chip 14_5 in the V2 direction, as indicated by the flow FRa6. Since the same applies to the following, to simplify the description, the gas discharged from the portion C34 by the flows FRa7, FRa8, FRa9, FRa10, FRa11, and FRa12 fills the first accommodation space S1.

Although not illustrated in FIG. 10, the flow of the gas in the first accommodation space S1 also exists in addition to the flows FRa2 to FRa12. For example, the flow FRa4 moves along the outer wall of the head chip 14_3 in the V2 direction and the outer wall in the W1 direction and merges with the flow FRa6. Similarly, the flow FRa5 moves along the outer wall of the head chip 14_5 in the V1 direction and the outer wall in the W1 direction and merges with the flow FRa8.

Figure 11:
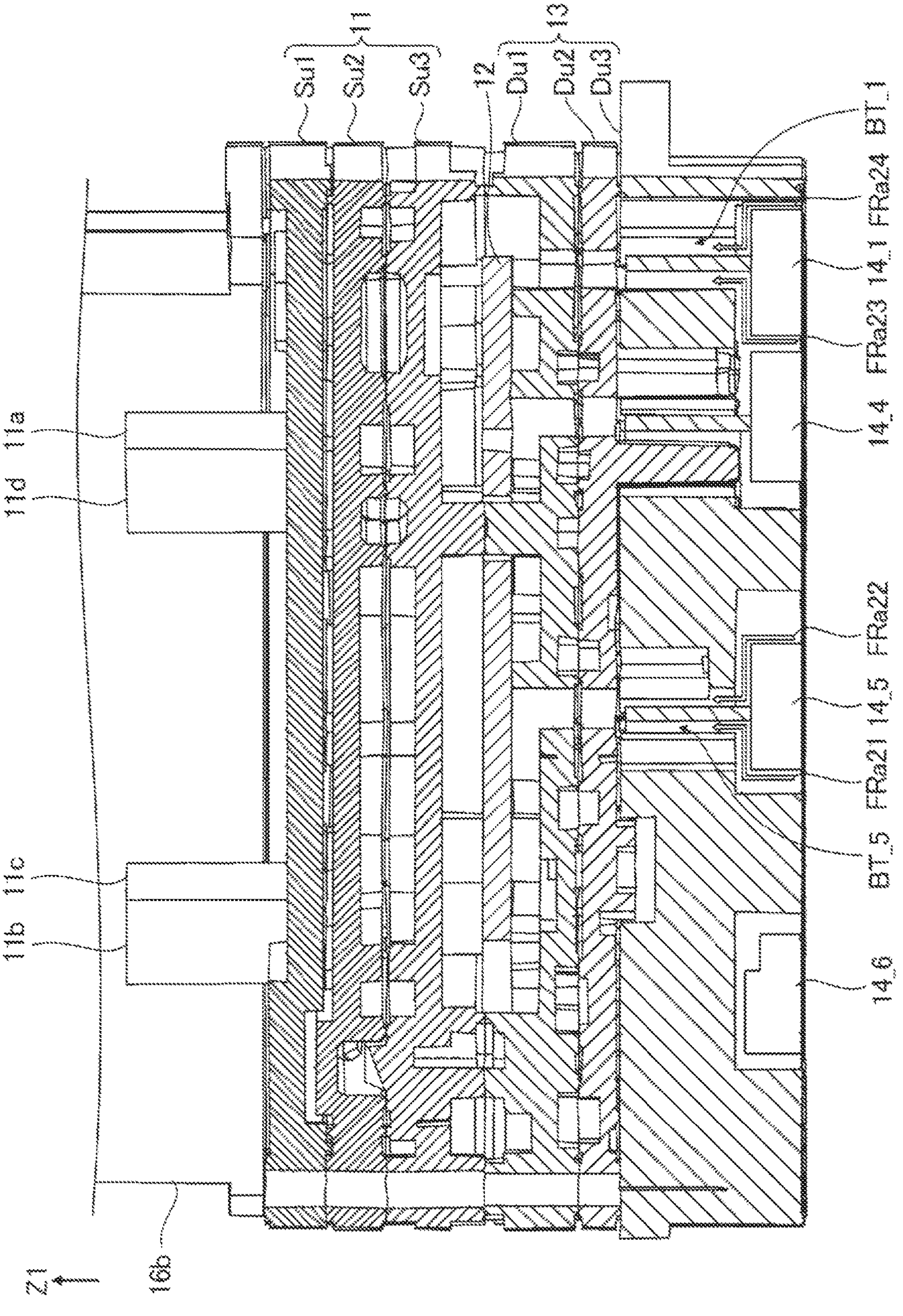
FIG. 11 is a cross-sectional view illustrating a cross section taken along the line XI-XI in FIG. 8.

FIG. 11 is a cross-sectional view illustrating a cross section taken along the line XI-XI in FIG. 8. The cross section taken along the line XI-XI is a cross section that passes through the head chips 14_6, 14_5, 14_4, and 14_1 and is parallel to the Z axis. In FIG. 11, the cross sections of the head chips 14_6, 14_5, 14_4, and 14_1 are not illustrated in order to prevent the drawing from being complicated. In FIG. 11, the flows FRa21, FRa22, FRa23, and FRa24 are illustrated as a part of the gas flow from the first accommodation space S1 to the branch path BT. The flow FRa21, FRa22, FRa23, and FRa24 are a part of the flow FRa illustrated in FIG. 11.

The gas filled in the first accommodation space S1 moves along the outer wall of the head chip 14 in the Z1 direction and reaches the branch path BT. In an example of FIG. 11, the gas existing in the vicinity of the outer wall of the head chip 14_5 in the direction orthogonal to the Z axis moves in the Z1 direction and reaches the branch path BT_5, as indicated by the flows FRa21 and FRa22. Similarly, the gas existing in the vicinity of the outer wall of the head chip 14_1 in the direction orthogonal to the Z axis moves in the Z1 direction and reaches the branch path BT_1, as indicated by the flows FRa23 and FRa24. The branch path BT will be described with reference to FIG. 12.

1-8. Branch Path BT

Figure 12:
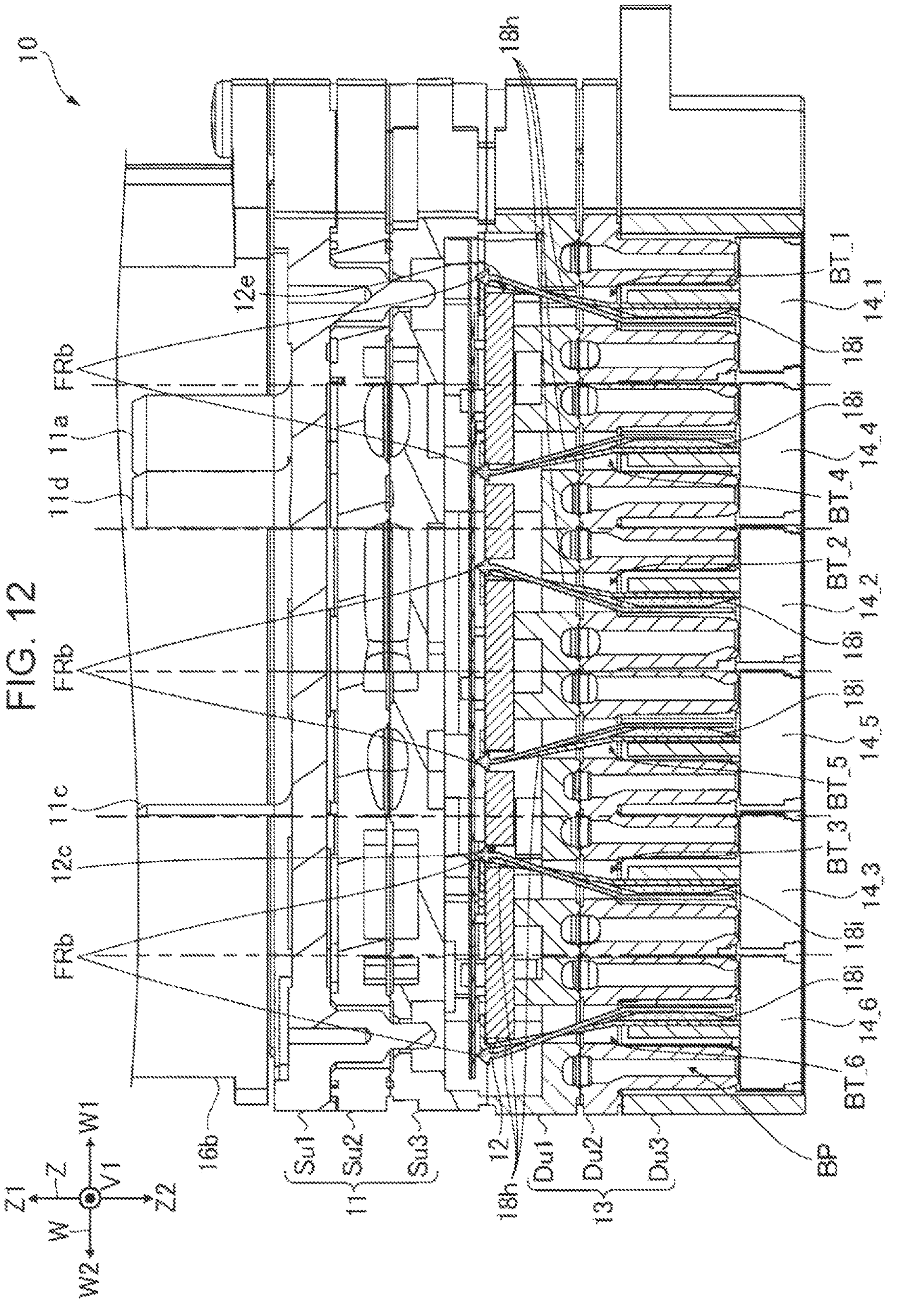
FIG. 12 is a view of a cross section taken along the line XII-XII in FIG. 8 as viewed in a V2 direction.

FIG. 12 is a view of a cross section taken along the line XII-XII in FIG. 8 as viewed in the V2 direction. The cross section taken along the line XII-XII is a cross section that cuts the drive circuit 18*i* that drives each of the six head chips 14. In FIG. 12, the cross sections of the head chips 14_1 to 14_6 are not illustrated in order to prevent the drawing from being complicated. In FIG. 12, the flow FRb is illustrated as the gas flow in the branch path BT.

As illustrated in FIG. 12, with respect to one head chip 14, a position of the W axis of the drive circuit 18*i* and a position of the W axis of the through hole 12*c* into which the wiring substrate 18*h* is inserted or the notch 12*e* are different from each other. The wiring substrate 18*h* is bent in the W1 direction and the W2 direction in order to pass through the drive circuit 18*i* and the through hole 12*c* or the notch 12*e*. Similarly, the branch path BT does not completely extend to the Z axis and is bent in the W1 direction and the W2 direction. Therefore, the flow FRb also moves in the Z1 direction along the bent branch path BT.

As described above, the first accommodation space S1 is formed by the recessed portion provided on the surface of the holder Du3 facing the Z2 direction. The six branch paths BT are holes provided in the flow path plates Du1 and Du2, and the holder Du3. Therefore, the six branch paths BT are disposed between the introduction portion Pin and the first accommodation space S1 in the Z axis.

1-9. Discharge Path PT2 and Discharge Portion Pout

Figure 13:
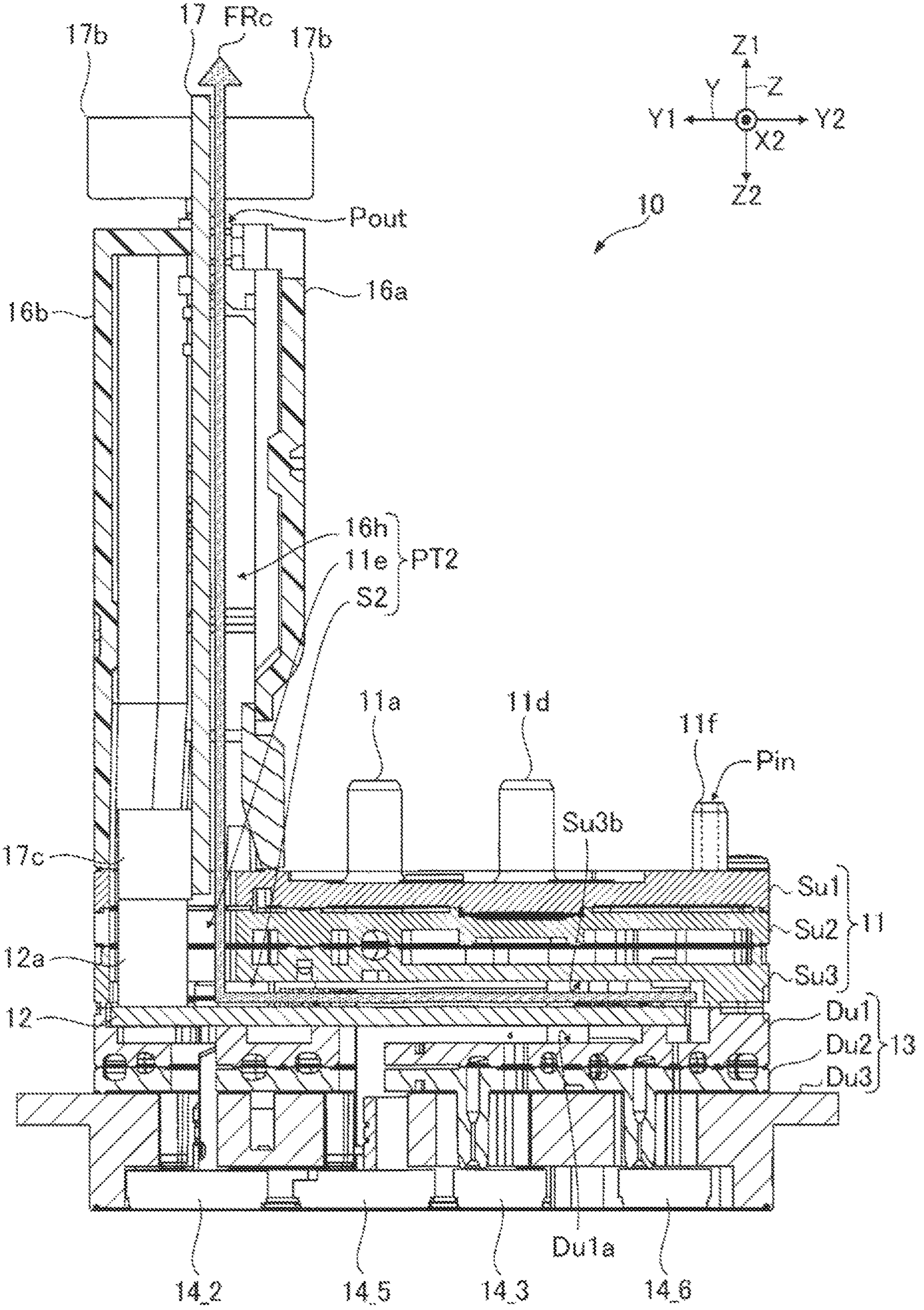
FIG. 13 is a cross-sectional view illustrating a cross section taken along the line XIII-XIII in FIG. 8.

The discharge path PT2 and the discharge portion Pout will be described with reference to FIG. 13. FIG. 13 is a cross-sectional view illustrating a cross section taken along the line XIII-XIII in FIG. 8. The cross section taken along the line XIII-XIII is a cross section that passes through the midpoint of the connector 17*b* in the X axis direction and is parallel to the Y axis and the Z axis. In FIG. 13, the cross sections of the head chips 14_2, 14_5, 14_3, and 14_6 are not illustrated in order to prevent the drawing from being complicated. FIG. 13 illustrates the flow FRc of the gas flowing from the second accommodation space S2 to the discharge portion Pout. In addition, in FIG. 13, the introduction portion Pin is illustrated by a broken line.

As illustrated in FIG. 13, the second accommodation space S2 is formed by a recessed portion provided on a surface of the filter plate Su3 facing the Z2 direction and a recessed portion provided on a surface of the flow path plate Du1 facing the Z1 direction. The gas heated by the drive circuit 18*i* moves in the second accommodation space S2 in the Y1 direction at a position in the Z1 direction with respect to the head substrate 12, as indicated by the flow FRc. Furthermore, the gas is discharged in the Z1 direction from the liquid ejecting head 10 by moving in the hole 11*e*, the through hole 16*h*, and the discharge portion Pout in the Z1 direction at a position in the Y2 direction with respect to the connector 12*a* and the connector substrate 17.

As illustrated in FIG. 13, the introduction portion Pin is provided at the end portion in the Y2 direction, and the discharge portion Pout is provided at the end portion in the Y1 direction. As the positions where the introduction portion Pin and the discharge portion Pout are provided are separated, it is easier to send the gas toward the head chip 14 that is separated from the introduction portion Pin in the direction perpendicular to the ejection direction, compared with the aspect in which the positions where the introduction portion Pin and the discharge portion Pout are provided are close to each other.

As described in FIG. 6, the flow of the gas flowing from the second accommodation space S2 to the discharge portion Pout is not limited to the flow FRc. Specifically, a part of the heated gas may be discharged in the Z1 direction from the liquid ejecting head 10 by moving in a direction orthogonal to the Z axis at a position in the Z2 direction with respect to the head substrate 12 and moving in the hole 11*e*, the through hole 16*h*, and the discharge portion Pout in the Z1 direction at a position in the Y1 direction with respect to the connector 12*a* and the connector substrate 17.

1-10. Positional Relationship of Each Path in Gas Path AP

The positional relationship of each path in the gas path AP will be described with reference to FIGS. 14 to 16.

Figure 14:
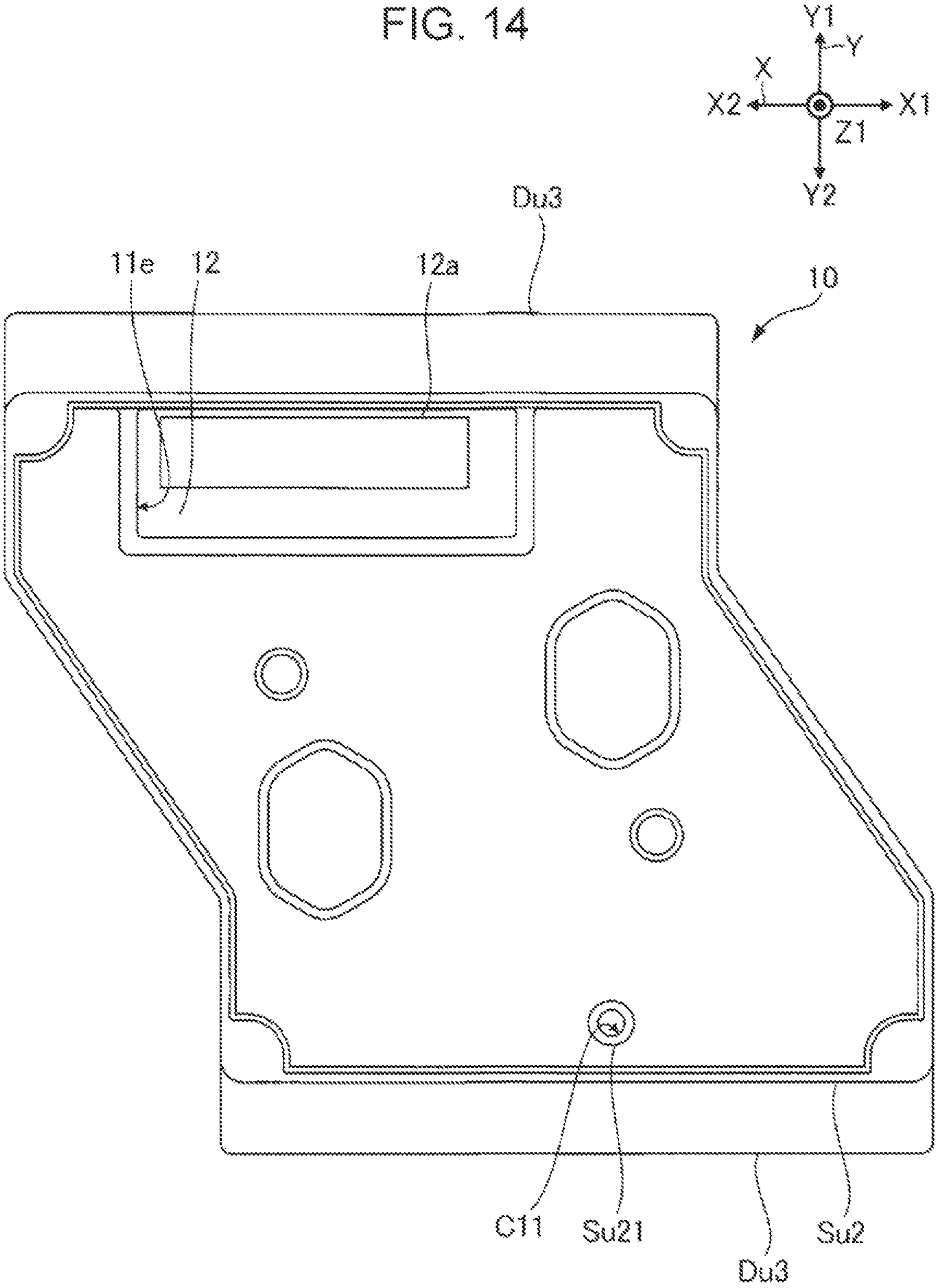
FIG. 14 is a plan view of the liquid ejecting head when a certain filter plate, a protective case, and a connector substrate are not illustrated.

FIG. 14 is a plan view of the liquid ejecting head 10 when the filter plate Su1, the protective case 16, and the connector substrate 17 are not illustrated. FIG. 15 is a plan view of the liquid ejecting head 10 when the filter plate Su2 is further not illustrated from a state of FIG. 14. FIG. 16 is a plan view of the liquid ejecting head 10 when the filter plate Su3 is further not illustrated from a state of FIG. 15. In addition, in FIG. 16, the introduction portion Pin and the horizontal portion C12 are displayed by a broken line.

Figure 15:
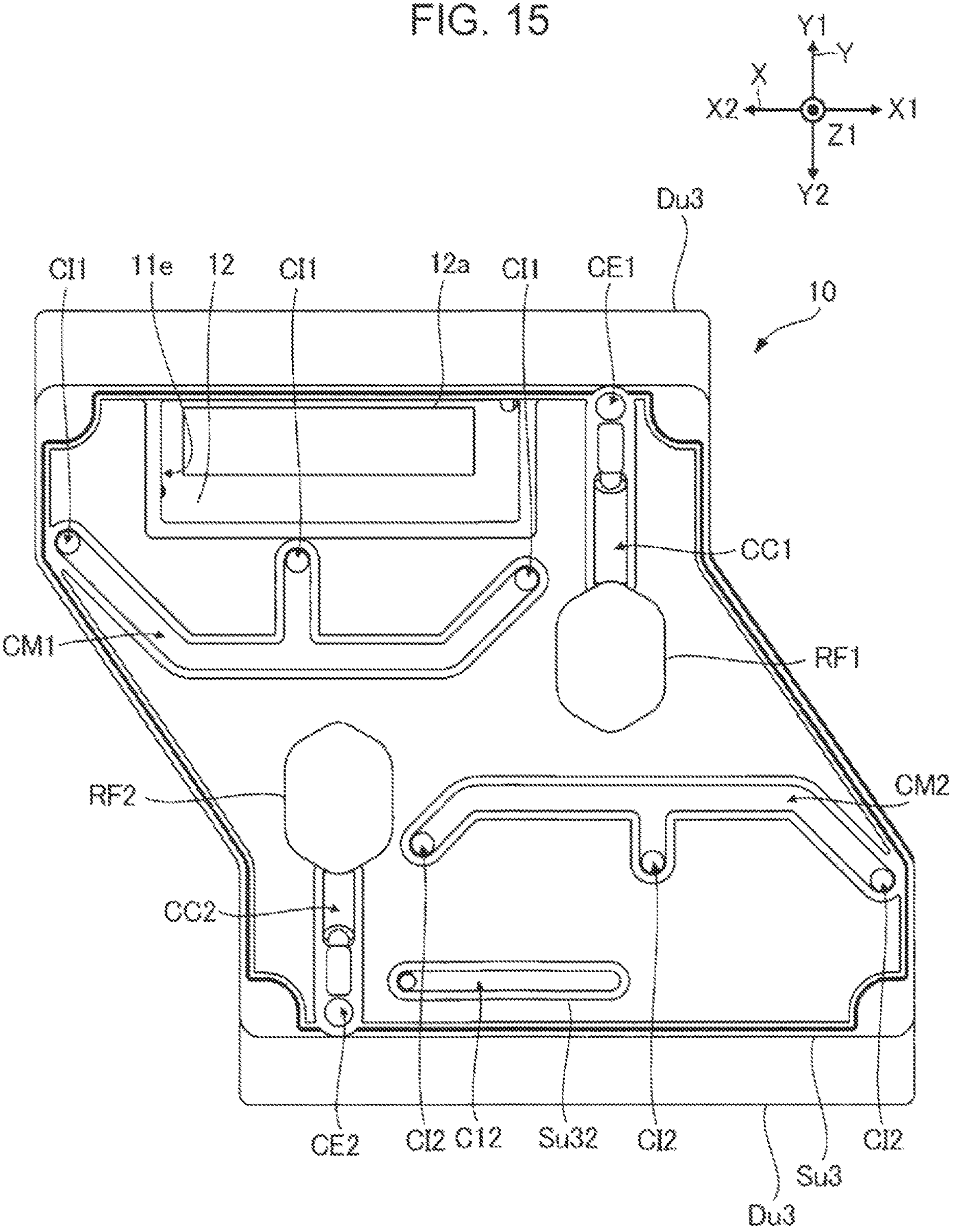
FIG. 15 is a plan view of the liquid ejecting head when a certain filter plate is further not illustrated from a state of FIG. 14.

As illustrated in FIG. 15, inside the filter unit 11, the first supply flow path CC1, the second supply flow path CC2, the first discharge flow path CM1, the second discharge flow path CM2, the first filter chamber RF1, and the second filter chamber RF2 are provided.

The first supply flow path CC1 is a flow path for supplying the first ink introduced into the coupling tube 11*a* to the holder unit 13. Here, the first supply flow path CC1 communicates with an internal space of the coupling tube 11*a* via the first filter chamber RF1. A discharge port CE1 coupled to the coupling tube 13*a* described above communicates with the first supply flow path CC1.

The second supply flow path CC2 is a flow path through which the second ink introduced into the coupling tube 11*b* is supplied to the holder unit 13 described above. Here, the second supply flow path CC2 communicates with an internal space of the coupling tube 11*b* via the second filter chamber RF2. A discharge port CE2 coupled to the coupling tube 13*b* described above communicates with the second supply flow path CC2.

The first discharge flow path CM1 is a flow path through which the first ink is discharged from the holder unit 13 described above from the coupling tube 11*c*. An introduction port CI1 coupled to the three coupling tubes 13*c* described above communicates with the first discharge flow path CM1.

The second discharge flow path CM2 is a flow path through which the second ink is discharged from the holder unit 13 described above from the coupling tube 11*d*. An introduction port C12 coupled to the three coupling tubes 13*d* described above communicates with the second discharge flow path CM2.

As illustrated in FIG. 14, since the coupling tube Su21 and the hole 11*e* are disposed apart from each other, the first vertical portion C11 which is a through hole of the coupling tube Su21 and the hole 11*e* do not directly communicate with each other. As illustrated in FIG. 15, since the wall body Su32 and the hole 11*e* are disposed apart from each other, the horizontal portion C12 formed by the wall body Su32 and the hole 11*e* do not directly communicate with each other. As illustrated in FIG. 16, the coupling tube 13*f* is formed in the bottom portion Du1*a*. Therefore, the portion C32, which is the through hole of the coupling tube 13*f*, and the second accommodation space S2 formed by the bottom portion Du1*a* are disposed apart from each other by a wall portion of the coupling tube 13*f*. Therefore, the communication portion C1 and the discharge path PT2 do not directly communicate with each other.

Figure 16:
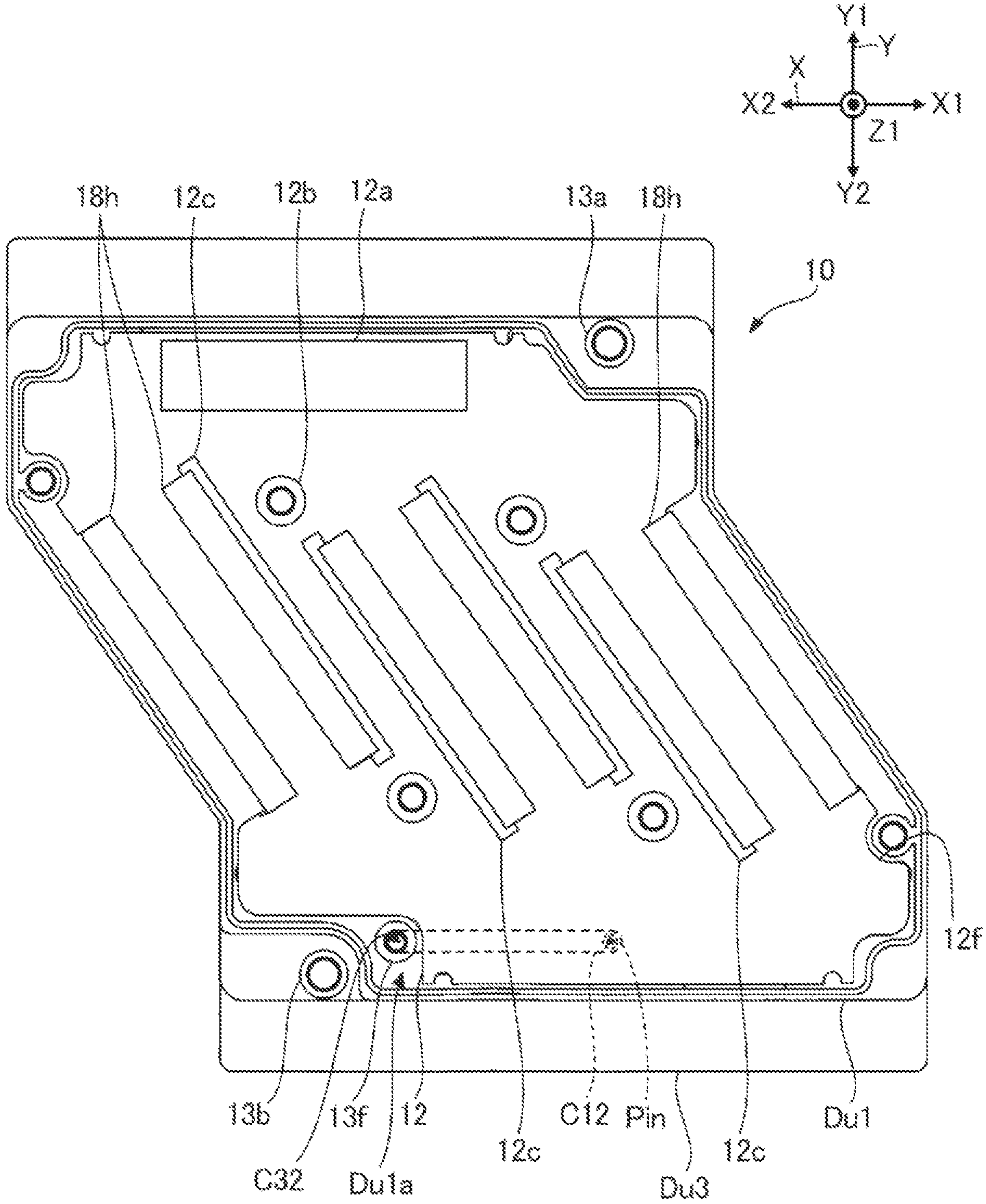
FIG. 16 is a plan view of the liquid ejecting head when a filter plate is further not illustrated from a state of FIG. 15.

In addition, as illustrated in FIG. 16, the coupling tube 13*f* is formed in the bottom portion Du1*a*. That is, in a plan view, the portion C31 and the portion C32 are disposed inside the second accommodation space S2. Therefore, the communication portion C1 and the discharge path PT2 overlap each other as viewed in the direction orthogonal to the Z axis.

As illustrated in FIG. 16, in a plan view, the introduction portion Pin overlaps with the head substrate 12. As illustrated in FIG. 16, one end of both ends of the horizontal portion C12, which is far from the introduction portion Pin, in a plan view is a portion that overlaps with the portion C32 in a plan view. In a plan view, the portion that overlaps with the portion C32 is located inside the coupling tube 13*f*. Therefore, a portion of both ends of the horizontal portion C12 that overlaps with the portion C32 does not overlap with the second accommodation space S2. Similarly, a portion of both ends of the horizontal portion C12 that overlaps with the portion C32 does not overlap with the head substrate 12.

1-11. Summary of First Embodiment

Hereinafter, the liquid ejecting head 10 according to the first embodiment will be described using x, y, and z which are integers from 1 to 6 and which are different values.

The liquid ejecting head 10 according to the first embodiment includes the plurality of head chips 14 that eject the ink in the Z2 direction. The liquid ejecting head 10 includes the introduction portion Pin for introducing the gas supplied from the gas supply mechanism 160 into the inside of the liquid ejecting head 10, the discharge portion Pout for discharging the gas supplied to the introduction portion Pin to the outside of the liquid ejecting head 10, and the plurality of drive circuits 18*i* provided in each of the plurality of head chips 14. The plurality of head chips 14 include the head chip 14_*x* and the head chip 14_*y*. The plurality of drive circuits 18*i* include the drive circuit 18*i*_*x* for driving the head chip 14_*x* and the drive circuit 18*i*_*y* for driving the head chip 14_*y*. The gas path AP through which the gas flows from the introduction portion Pin to the discharge portion Pout has the supply path PT1 coupled to the introduction portion Pin, the discharge path PT2 coupled to the discharge portion Pout, the branch path BT_x coupling the supply path PT1 and the discharge path PT2, and the branch path BT_y coupling the supply path PT1 and the discharge path PT2 so as not to pass through the branch path BT_x. The drive circuit 18*i*_*x* is disposed on the branch path BT_x. The drive circuit 18*i*_*y* is disposed on the branch path BT_y.

The drive circuit 18*i* generates heat by driving the head chip 14. When the ejection amount of the head chip 14_*x* and the ejection amount of the head chip 14_*y* are different from each other, it is highly possible that the heat generation amount of the drive circuit 18*i*_*x* and the heat generation amount of the drive circuit 18*i*_*y* are different from each other. The magnitude relationship between the heat generation amount of the drive circuit 18*i*_*x* and the heat generation amount of the drive circuit 18*i*_*y* depends on the image indicated by the image data Img. In the aspect in which one drive circuit 18*i* of the drive circuit 18*i*_*x* and the drive circuit 18*i*_*y* is preferentially cooled, when the heat generation amount of the other drive circuit 18*i* is larger than that of the one drive circuit 18*i* depending on the image indicated by the image data Img, the other drive circuit 18*i* may not be sufficiently cooled. When the drive circuit 18*i* reaches a predetermined temperature, in order to prevent the drive circuit 18*i* from failing because of heat, it is conceivable to stop the operation of the drive circuit 18*i* until the temperature of the drive circuit 18*i* becomes less than the predetermined temperature. However, when the operation of the drive circuit 18*i* is stopped, the period required for forming an image on the medium M is extended.

In the liquid ejecting head 10 according to the first embodiment, the gas not heated by the drive circuit 18*i* is dispersed and blown into the drive circuit 18*i*_*x* and the drive circuit 18*i*_*y*, so that the drive circuit 18*i*_*x* and the drive circuit 18*i*_*y* can be uniformly cooled. Therefore, according to the liquid ejecting head 10 according to the first embodiment, it is possible to suppress a state in which the drive circuit 18*i* cannot be sufficiently cooled depending on the image indicated by the image data Img as compared with the aspect in which one drive circuit 18*i* of the drive circuit 18*i*_*x* and the drive circuit 18*i*_*y* is preferentially cooled.

The supply path PT1 includes the first accommodation space S1 that accommodates the plurality of head chips 14, and the communication portion C1 through which the first accommodation space S1 communicates with the introduction portion Pin. Each of the branch path BT_x and the branch path BT_y is coupled to the first accommodation space S1.

The head substrate 12 coupled to the head chip 14_*x* and the head chip 14_*y* is further provided, the discharge path PT2 includes the second accommodation space S2 that accommodates the head substrate 12, and each of the branch path BT_x and the branch path BT_y is coupled to the second accommodation space S2.

In addition, the liquid ejecting head 10 according to the first embodiment further includes the holder unit 13 stacked on the plurality of head chips 14 in a direction opposite to the Z2 direction and disposed between the first accommodation space S1 and the second accommodation space S2, the wiring substrate 18*h*_*x* that couples the head substrate 12 and the head chip 14_*x* and is provided with the drive circuit 18*i*_*x*, and the wiring substrate 18*h*_*y* that couples the head substrate 12 and the head chip 14_*y* and is provided with the drive circuit 18*i*_*y*. The holder unit 13 is formed with a through hole 13*e*_*x* that penetrates in the Z2 direction and into which the wiring substrate 18*h*_*x* is inserted, and a through hole 13*e*_*y* that penetrates in the Z2 direction and into which the wiring substrate 18*h*_*y* is inserted. The branch path BT_x is the through hole 13*e*_*x*, and the branch path BT_y is the through hole 13*e*_*y*.

In the liquid ejecting head 10 according to the first embodiment, the routing of the gas path AP can be simplified by disposing the drive circuit 18*i* in the branch path BT, which is the through hole 13*e* for coupling the head substrate 12 and the head chip 14 as compared with the configuration in which the drive circuit 18*i* is disposed in the case 14*f*.

In addition, the liquid ejecting head 10 further includes the filter unit 11 that defines the surface Sal of the liquid ejecting head 10 facing a direction opposite to the Z1 direction, and the introduction portion Pin is provided on the surface Sal of the filter unit 11.

In the liquid ejecting head 10 according to the first embodiment, the introduction portion Pin is provided on the surface Sal facing the Z1 direction of the liquid ejecting head 10, that is, an upper surface, so that attachment and detachment to the gas supply mechanism 160 becomes easier as compared with the aspect in which the introduction portion Pin is provided on a side surface or a bottom surface of the liquid ejecting head 10. In addition, as illustrated in FIG. 2, the plurality of liquid ejecting heads 10 are disposed along the X axis. Therefore, the plurality of liquid ejecting heads 10 can be disposed at a high density as compared with the aspect in which the introduction portion Pin is provided on the side surface of the liquid ejecting head 10 in the X1 direction or the X2 direction. Furthermore, the plurality of liquid ejecting heads 10 may be disposed along the Y axis. When the plurality of liquid ejecting heads 10 are disposed along the Y axis, in the liquid ejecting head 10 according to the first embodiment, the plurality of liquid ejecting heads 10 can be disposed at a high density as compared with the aspect in which the introduction portion Pin is provided on the side surface of the liquid ejecting head 10 in the Y1 direction or the Y2 direction.

The surface Sal of the filter unit 11 is provided with an internal space of the coupling tube 11*a* and the coupling tube 11*b* for introducing ink into the inside of the liquid ejecting head 10, that is, the liquid introduction portion Lin.

The introduction portion Pin and the liquid introduction portion Lin are provided in a common member on the surface Sal of the liquid ejecting head 10 according to the first embodiment, so that the number of components constituting the liquid ejecting head 10 can be reduced as compared with an aspect in which the introduction portion Pin and the liquid introduction portion Lin are provided in a separate member.

In addition, the discharge portion Pout discharges the gas to the outside of the liquid ejecting head 10 in a direction opposite to the Z2 direction.

In the aspect of discharging the gas in the Z1 direction, an airflow may be generated between the medium M and the nozzle surface FN, and the landing accuracy of the liquid ejected from the nozzle N on the medium M may be lowered. On the other hand, the liquid ejecting head 10 according to the first embodiment can suppress the generation of the airflow between the nozzle surface FN and the medium M and can prevent printing defects as compared with the aspect of discharging the gas in the Z1 direction.

In addition, the branch path BT_x and the branch path BT_y are disposed between the introduction portion Pin and the first accommodation space S1 in the Z2 direction, and the communication portion C1 and the discharge path PT2 do not directly communicate with each other.

In the aspect in which the communication portion C1 and the discharge path PT2 directly communicate with each other, a part of the gas flowing through the supply path PT1 flows out to the discharge path PT2 without passing through the branch path BT. The gas flowing out to the discharge path PT2 without passing through the branch path BT is discharged from the discharge portion Pout without cooling the drive circuit 18*i*. Therefore, the liquid ejecting head 10 according to the first embodiment can efficiently cool the drive circuit 18*i* as compared with the aspect in which the communication portion C1 and the discharge path PT2 directly communicate with each other.

In addition, the communication portion C1 and the discharge path PT2 overlap each other as viewed in the direction orthogonal to the Z2 direction.

As described above, in the liquid ejecting head 10 according to the first embodiment, since the communication portion C1 and the discharge path PT2 do not directly communicate with each other to efficiently cool the drive circuit 18*i* and no gas is introduced from the side surface of the liquid ejecting head 10, the plurality of liquid ejecting heads 10 can be disposed at a high density in the direction orthogonal to the Z2 direction.

In addition, in the plan view as viewed in the Z2 direction, the introduction portion Pin overlaps with the head substrate 12, the communication portion C1 includes the horizontal portion C12 extending in the direction orthogonal to the Z2 direction, and in the plan view, one end of both ends of the horizontal portion C12 which is far from the introduction portion Pin does not overlap with the head substrate 12.

By routing the communication portion C1 to bypass the head substrate 12 by the horizontal portion C12, the position where the introduction portion Pin is provided is not limited in plan view. That is, the liquid ejecting head 10 according to the first embodiment can improve the degree of freedom of the position where the introduction portion Pin is provided.

In addition, in the plan view as viewed in the Z2 direction, the end portion of the communication portion C1 coupled to the first accommodation space S1 does not overlap with the plurality of head chips 14.

The liquid ejecting head 10 according to the first embodiment can make it easier for the gas to flow into the first accommodation space S1 as compared with an aspect in which the gas is directly blown into the head chip 14. By making it easier for the gas to flow into the first accommodation space S1, the gas not heated by the drive circuit 18*i* easily fills the first accommodation space S1 more uniformly, so that the drive circuit 18*i_x* and the drive circuit 18*i_y* can be cooled uniformly.

In addition, in the plan view as viewed in the Z2 direction, the end portion of the communication portion C1 coupled to the first accommodation space S1 does not overlap with the plurality of head chips 14, a wiring opening into which the connector substrate 17 coupled to the head substrate 12 is inserted is formed on the outer wall of the liquid ejecting head 10, and the discharge portion Pout is a wiring opening coupled to only one end of the discharge path PT2.

In the liquid ejecting head 10 according to the first embodiment, the wiring opening, which is the only infiltration path for mist and paper dust, also functions as the discharge portion Pout, so that the routing of the discharge path PT2 can be simplified and miniaturized, and the infiltration of mist and paper dust can be efficiently prevented.

It is possible to prevent the second accommodation space S2 from being a space that is shared by both the supply path PT1 and the discharge path PT2, and the cooling efficiency can be improved. That is, in the liquid ejecting head 10 according to the first embodiment, the gas supplied from the introduction portion Pin is first lowered to the end portion in the Z2 direction where the head chip 14 exists, and then moves upward along the plurality of branch paths BT, the branch paths BT are merged in the second accommodation space S2. Therefore, both the measure for mist and improvement in cooling efficiency can be achieved.

In the present embodiment, instead of the connector substrate 17 which is a part of the liquid ejecting head 10, a wiring member such as a flexible flat cable that is an external wiring member of the liquid ejecting head 10 and couples the liquid ejecting head 10 and the control unit 120 may be provided, as the "second relay substrate".

In addition, the number of introduction portions Pin is smaller than the number of the plurality of head chips 14.

In the liquid ejecting head 10 according to the first embodiment, the components can be simplified as compared with the case where the head chips 14 are provided with the introduction portions Pin having a one-to-one correspondence, and the gas supply mechanism 160 can be easily attached and detached.

The number of introduction portions Pin is one.

In the liquid ejecting head 10 according to the first embodiment, the components can be simplified as compared with the case where the plurality of introduction portions Pin are provided, and the gas supply mechanism 160 can be easily attached and detached.

The drive circuit 18*i* includes a switching element that can select whether or not to supply the drive signal Com for driving the piezoelectric element 14*e* for ejecting the ink.

The switching element generates heat by supplying the drive signal Com and switching between a state in which the drive signal Com is supplied and a state in which the drive signal Com is not supplied. According to the liquid ejecting head 10 according to the first embodiment, it is possible to suppress a state in which the drive circuit 18*i* cannot be sufficiently cooled depending on the image indicated by the image data Img as compared with the aspect in which one drive circuit 18*i* of the drive circuit 18*i_x* and the drive circuit 18*i_y* is preferentially cooled.

The plurality of head chips 14 include the head chip 14_*z*, the plurality of drive circuits 18*i* include the drive circuit 18*i_z* for driving the head chip 14_*z*, the gas path AP has the branch path BT z coupling the supply path PT1 and the discharge path PT2 so as not to pass through the branch path BT_x and the branch path BT_y, and the drive circuit 18*i_z* is disposed in the branch path BT z.

According to the liquid ejecting head 10 according to the first embodiment, the gas not heated by the drive circuit 18*i* is dispersed and blown into the drive circuit 18*i_x*, the drive circuit 18*i_y*, and the drive circuit 18*i_z*, so that the drive circuit 18*i_x*, the drive circuit 18*i_y*, and the drive circuit 18*i_z* can be uniformly cooled.

The liquid ejecting apparatus 100 according to the first embodiment includes the liquid ejecting head 10 and the gas supply mechanism 160 that supplies the gas to the introduction portion Pin of the liquid ejecting head 10.

The liquid ejecting apparatus 100 according to the first embodiment can uniformly cool the drive circuit 18*i_x* and the drive circuit 18*i_y*.

2. Modification Example

Each form exemplified above can be variously modified. Specific modification aspects are exemplified below. Two or more aspects optionally selected from the following examples can be appropriately combined within a scope where the aspects do not contradict each other.

2-1. First Modification Example

Figure 17:
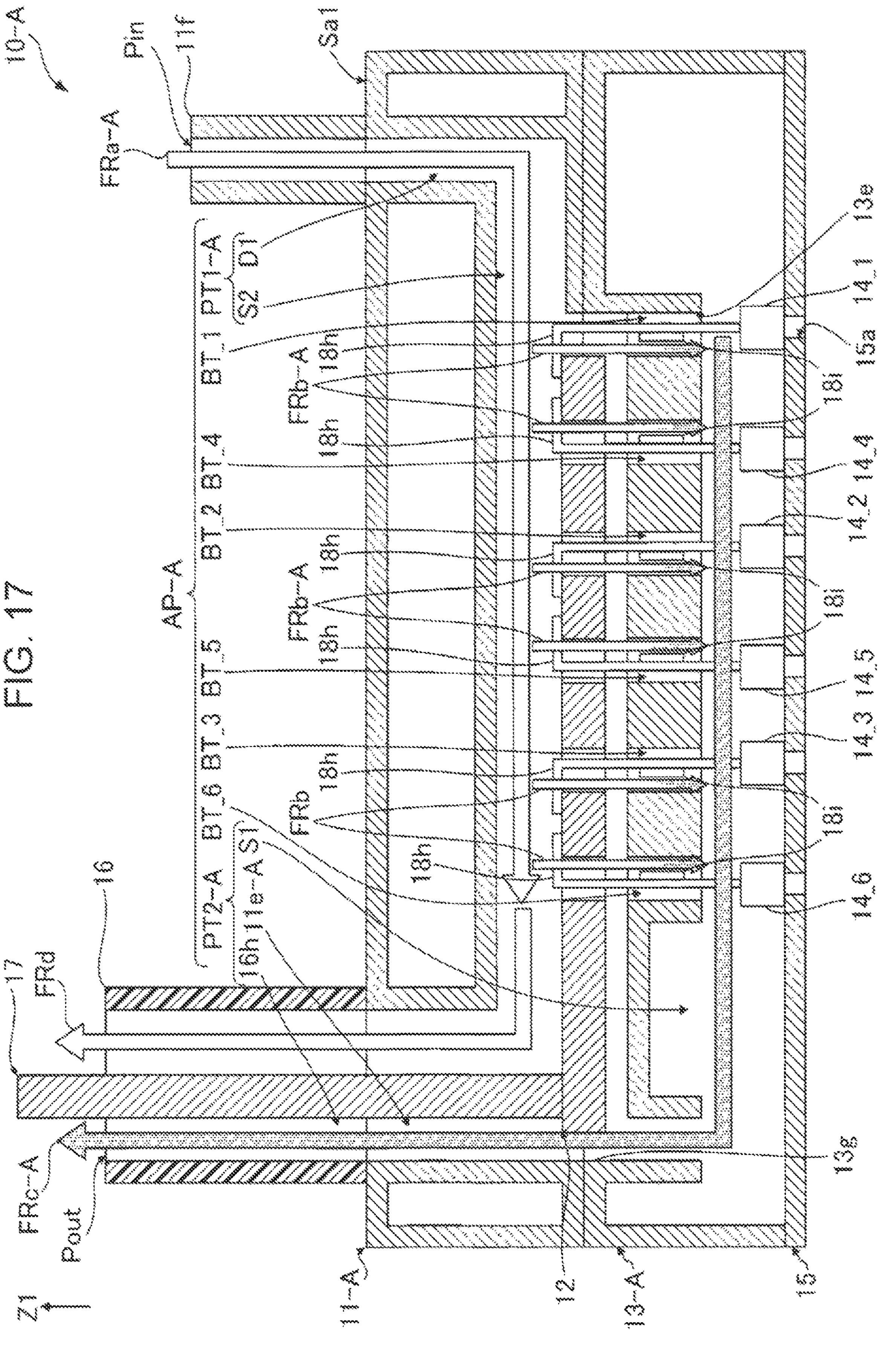
FIG. 17 is a view schematically illustrating a path in a liquid ejecting head according to a first modification example.

FIG. 17 is a view schematically illustrating the path in the liquid ejecting head 10-A according to a first modification example. In FIG. 17, for the easy description of the path, a positional relationship of each element in the liquid ejecting head 10-A in a direction perpendicular to the Z axis and a direction of each element are appropriately changed, which are different from the original positional relationship of each element and the direction of each element. Furthermore, FIG. 17 illustrates gas flows FRa-A, FRb-A, FRc-A, and FRd in the liquid ejecting head 10-A.

The liquid ejecting head 10-A differs from the liquid ejecting head 10 in that it has a filter unit 11-A instead of the filter unit 11 and a holder unit 13-A instead of the holder unit 13. The liquid ejecting head 10-A has a gas path AP-A instead of the gas path AP because of the shapes of the filter unit 11-A and the holder unit 13-A. The gas path AP-A differs from the gas path AP in that it has a supply path PT1-A instead of the supply path PT1 and a discharge path PT2-A instead of the discharge path PT2. The supply path PT1-A differs from the supply path PT1 in that it has a coupling portion D1 instead of the communication portion C1 and the second accommodation space S2 instead of the first accommodation space S1. The discharge path PT2-A differs from the discharge path PT2 in that it has a hole 11*e*-A instead of the hole 11*e* and the first accommodation space S1 instead of the second accommodation space S2.

The coupling portion D1 communicates with the second accommodation space S2 from the introduction portion Pin. The hole 11*e*-A is the same as the hole 11*e* in that it communicates with the second accommodation space S2. Each of the first accommodation space S1 and the second accommodation space S2 differs from each of the first accommodation space S1 and the second accommodation space S2 of the first embodiment in that they communicate with each other via an opening 13*g* which will be described later.

In the first modification example, as indicated by the flow FRa-A, the gas supplied from the gas supply mechanism 160 is introduced into the second accommodation space S2 via the introduction portion Pin and the coupling portion D1. The flow FRa-A is indicated by a white arrow. As indicated by the flow FRb-A, the gas introduced into the second accommodation space S2 reaches the first accommodation space S1 via the branch path BT of any of the branch paths BT_1 to BT_6. The flow FRb-A is a flow from the Z1 direction to the Z2 direction. As illustrated in FIG. 17, the holder unit 13-A is provided with the opening 13*g* that communicates between the first accommodation space S1 and the hole 11*e*-A. The drive circuit 18*i* is not disposed at the opening 13*g*. As indicated by the flow FRc-A, the heated gas is discharged in the Z1 direction via the opening 13*g*, the hole 11*e*-A, and the discharge portion Pout. The flow FRc-A is indicated by a shaded arrow.

Also in the first modification example, since the gas not heated by the drive circuit 18*i* is dispersed and blown into each of the plurality of drive circuits 18*i*, the plurality of drive circuits 18*i* can be uniformly cooled.

In the present modification example, a part of the second accommodation space S2 on the introduction portion Pin side is a part of the supply path PT1-A, and the remaining portion of the second accommodation space S2 (in other words, a part on the discharge portion Pout side) is a part of the discharge path PT2-A. That is, the supply path PT1-A and the discharge path PT2-A are directly coupled. Therefore, when comparing the first embodiment with the first modification example, in the first modification example, as indicated in the flow FRd, a part of the gas not heated by the drive circuit 18*i* is discharged via the hole 11*e* and the discharge portion Pout. In order to prevent the flow FRd from occurring, it is possible to provide a sealing member that divides the second accommodation space S2, but the number of components of the liquid ejecting head 10 increases. In addition, by changing the shapes of the filter unit 11-A and the holder unit 13-A, it is possible to prevent the flow FRd from occurring, but structural restrictions increase.

In addition, in the first modification example, there is a possibility that the gas flows back from the first accommodation space S1 to the second accommodation space S2 via the plurality of through holes 13*e*. Specifically, in the flow FRb-A, the temperature of the gas increases as it moves downstream, but as the temperature increases, the density decreases and the gas tends to rise. Therefore, the heated gas may move in the Z1 direction along the branch path BT. When the gas flows back, since the heated gas is less likely to be discharged to the outside of the liquid ejecting head 10-A, the cooling efficiency is lowered. In addition, as described above, since the supply path PT1-A and the discharge path PT2-A are directly coupled, there is a possibility that the gas flowing through the supply path PT1 flows toward the discharge path PT2-A without passing through the branch path BT, and then moves toward the opening 13*g* instead of the discharge portion Pout, and flows back in the opening 13*g* in the Z2 direction. Therefore, the liquid ejecting head 10 according to the first embodiment can improve the cooling efficiency as compared with the liquid ejecting head 10-A according to the first modification example.

2-2. Second Modification Example

In each of the above-described aspects, the introduction portion Pin is provided on the upper surface of the liquid ejecting head 10, that is, on the surface Sal of the filter plate Su1, but may be provided on the side surface of the liquid ejecting head 10.

2-3. Third Modification Example

In the first embodiment and the second modification example based on the first embodiment, the communication portion C1 and the discharge path PT2 do not directly communicate with each other, but may directly communicate with each other.

2-4. Fourth Modification Example

In the first embodiment, the second modification example based on the first embodiment, and the third modification example based on the first embodiment or the second modification example, in the plan view, the end portion coupled to the first accommodation space S1 of the communication portion C1 does not overlap with the plurality of head chips 14, but may overlap with any head chip 14 of the plurality of head chips 14.

2-5. Fifth Modification Example

In each of the above-described aspects, the connector substrate 17 is inserted into the discharge portion Pout, but the present disclosure is not limited thereto.

Figure 18:
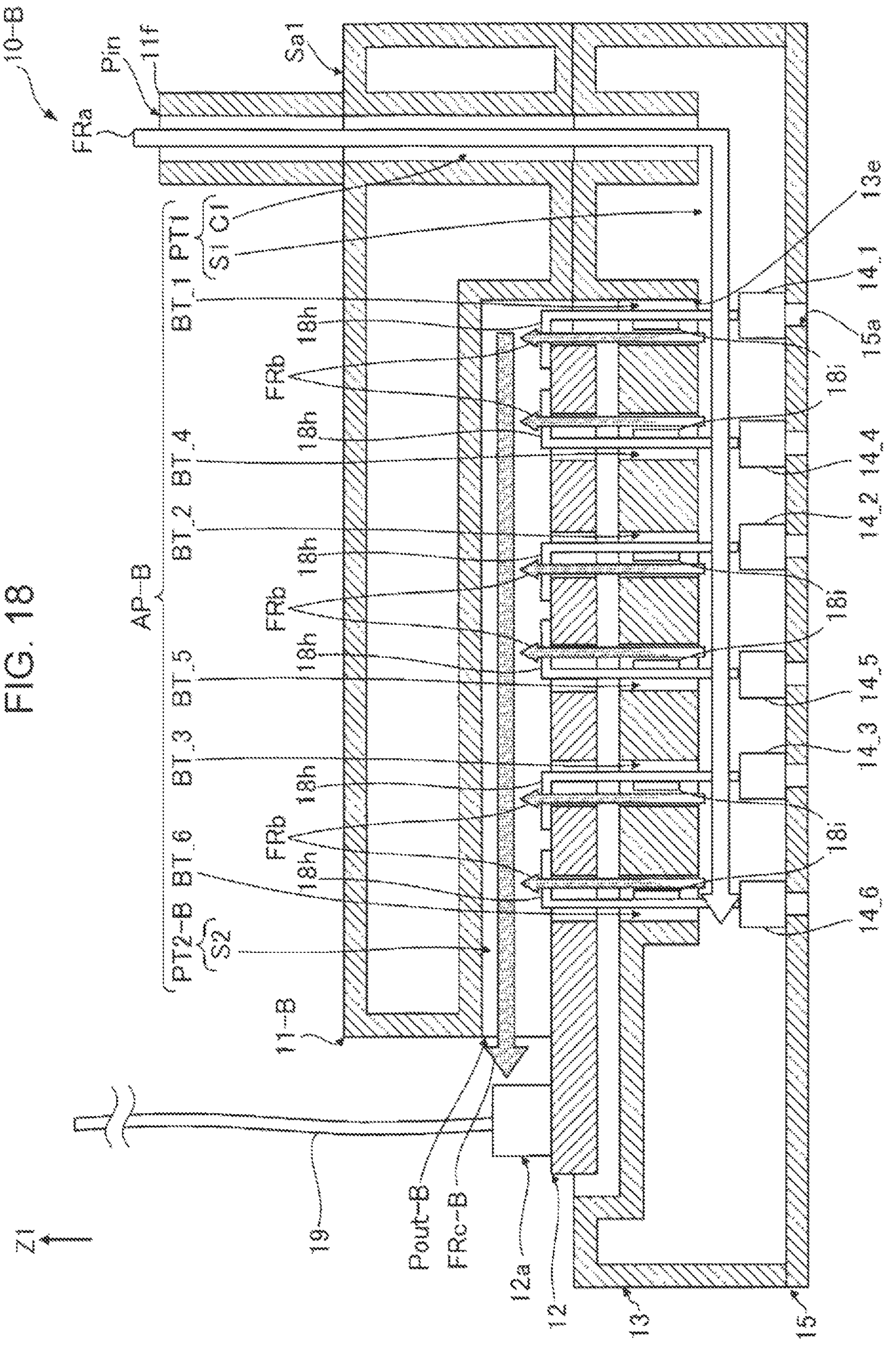
FIG. 18 is a view schematically illustrating a path in a liquid ejecting head according to a fifth modification example.

FIG. 18 is a view schematically illustrating a path in a liquid ejecting head 10-B according to a fifth modification example. In FIG. 18, for the easy description of the path, a positional relationship of each element in the liquid ejecting head 10-B in a direction perpendicular to the Z axis and a direction of each element are appropriately changed, which are different from the original positional relationship of each element and the direction of each element. Furthermore, in FIG. 18, gas flows FRa, FRb, and FRc-B in the liquid ejecting head 10-B are illustrated.

The liquid ejecting head 10-B differs from the liquid ejecting head 10 in that it has a filter unit 11-B instead of the filter unit 11, a wiring member 19 instead of the connector substrate 17, and does not have the protective case 16.

The filter unit 11-B differs from the filter unit 11 in that it does not overlap with the connector 12*a* in the plan view. Since the filter unit 11-B does not overlap with the connector 12*a* in the plan view, a part of the region of the head substrate 12 including the connector 12*a* is exposed to the outside of the liquid ejecting head 10. The wiring member 19 is an external wiring member of the liquid ejecting head 10, and couples the liquid ejecting head 10 and the control unit 120. One end of the wiring member 19 is coupled to the connector 12*a*. The wiring member 19 is, for example, a flexible flat cable.

The liquid ejecting head 10-B has a gas path AP-B instead of the gas path AP because of the shapes of the filter unit 11-B and the holder unit 13. The gas path AP-B differs from the gas path AP in that it has a discharge path PT2-B instead of the discharge path PT2. The discharge path PT2-B differs from the discharge path PT2 in that it does not have the hole 11*e* and the through hole 16*h*.

The second accommodation space S2 according to the fifth modification example is coupled to a discharge portion Pout-B formed on an outer wall of the liquid ejecting head 10-B. The discharge portion Pout-B is an opening defined by the filter unit 11-B and the holder unit 13. It can also be said that the discharge portion Pout-B is a wiring opening into which the head substrate 12 is inserted. The discharge portion Pout-B is coupled to only one end of the discharge path PT-B.

As illustrated in FIG. 18, in the flow FRc-B, it is discharged from the second accommodation space S2 according to the fifth modification example via the discharge portion Pout-B in a direction perpendicular to the Z axis. As illustrated in the fifth modification example, the discharge portion Pout-B discharges the gas to the outside of the liquid ejecting head 10-B in a direction other than the Z1 direction opposite to the ejection direction.

2-6. Sixth Modification Example

As illustrated in FIG. 1, the above-described liquid ejecting apparatus 100 is a so-called line type liquid ejecting apparatus in which the plurality of liquid ejecting heads 10 are fixed to the support body 41 and printing is performed simply by transporting the medium M, but the configuration of the liquid ejecting apparatus is not limited to that described above. For example, the present disclosure can also be applied to a so-called serial type liquid ejecting apparatus in which the plurality of liquid ejecting heads 10 are mounted on a carriage, the plurality of the liquid ejecting heads 10 are reciprocated along the X axis direction, and printing is performed by transporting the medium M.

2-7. Other Modification Examples

The above-described liquid ejecting apparatus can be adopted in various apparatuses such as a facsimile machine and a copier, in addition to an apparatus dedicated to printing. However, the application of the liquid ejecting apparatus of the present disclosure is not limited to printing. For example, the liquid ejecting apparatus that ejects a solution of a coloring material is used as a manufacturing apparatus for forming a color filter of a liquid crystal display device. In addition, a liquid ejecting apparatus that ejects a solution of a conductive material is used as a manufacturing apparatus for forming wiring and electrodes of a wiring substrate.

3. Appendix

From the above-exemplified embodiment, for example, the following configuration can be grasped.

A liquid ejecting head according to Aspect 1, which is a preferred aspect, includes: a plurality of head chips that eject liquid in an ejection direction; one or a plurality of introduction portions for introducing a gas supplied from a gas supply mechanism into an inside of the liquid ejecting head; a discharge portion for discharging the gas supplied to the one or the plurality of introduction portions to an outside of the liquid ejecting head; and a plurality of drive circuits provided in each of the plurality of head chips, in which the plurality of head chips include a first head chip and a second head chip, the plurality of drive circuits include a first drive circuit for driving the first head chip and a second drive circuit for driving the second head chip, a gas path through which the gas flows from the one or the plurality of introduction portions to the discharge portion includes a first path coupled to the one or the plurality of introduction portions, a second path coupled to the discharge portion, a first branch path coupling the first path and the second path, and a second branch path coupling the first path and the second path so as not to pass through the first branch path, the first drive circuit is disposed in the first branch path, and the second drive circuit is disposed in the second branch path.

According to the Aspect 1, since the gas not heated by the drive circuit is dispersed and blown to the first drive circuit and the second drive circuit, the first drive circuit and the second drive circuit can be uniformly cooled.

In Aspect 2 which is a specific example of the Aspect 1, the first path includes a first accommodation space accommodating the plurality of head chips and a communication portion through which the first accommodation space communicates with the one or the plurality of introduction portions, and each of the first branch path and the second branch path is coupled to the first accommodation space.

In Aspect 3 which is a specific example of the Aspect 2, the liquid ejecting head further includes a first relay substrate coupled to the first head chip and the second head chip, in which the second path includes a second accommodation space accommodating the first relay substrate, and each of the first branch path and the second branch path is coupled to the second accommodation space.

In Aspect 4 which is a specific example of the Aspect 3, the liquid ejecting head further includes: a first member stacked on the plurality of head chips in a direction opposite to the ejection direction and disposed between the first accommodation space and the second accommodation space; a first wiring substrate that couples the first relay substrate and the first head chip and is provided with the first drive circuit; and a second wiring substrate that couples the first relay substrate and the second head chip and is provided with the second drive circuit. In the first member, a first through hole that penetrates in the ejection direction and into which the first wiring substrate is inserted, and a second through hole that penetrates in the ejection direction and into which the second wiring substrate is inserted are formed, the first branch path is the first through hole, and the second branch path is the second through hole.

According to the Aspect 4, by disposing the drive circuit in the branch path which is a through hole for coupling the first relay substrate and the head chip, the routing of the gas path can be simplified as compared with the configuration in which the drive circuit is disposed in the head chip.

In Aspect 5 which is a specific example of the Aspect 1, the liquid ejecting head further includes a second member defining a first surface facing a direction opposite to the ejection direction of the liquid ejecting head, in which the one or the plurality of introduction portions are provided on the first surface of the second member.

According to the Aspect 5, the introduction portion is provided on the first surface facing the direction opposite to the ejection direction of the liquid ejecting head, that is, an upper surface, so that the attachment and detachment to the gas supply mechanism becomes easier as compared with the aspect in which the introduction portion is provided on a side surface or a bottom surface of the liquid ejecting head.

In Aspect 6 which is a specific example of the Aspect 5, a liquid introduction portion for introducing the liquid into the inside of the liquid ejecting head is provided on the first surface of the second member.

According to the Aspect 6, the introduction portion and the liquid introduction portion are provided in a common member on the first surface, so that the number of components constituting the liquid ejecting head can be reduced as compared with the aspect in which the introduction portion and the liquid introduction portion are provided in different members.

In Aspect 7 which is a specific example of the Aspect 1, the discharge portion discharges the gas to the outside of the liquid ejecting head in a direction opposite to the ejection direction.

According to the Aspect 7, as compared with the aspect of discharging the gas in the ejection direction, it is possible to suppress the generation of an airflow between the nozzle surface and the medium, and it is possible to prevent printing defects.

In Aspect 8 which is a specific example of the Aspect 2, the first branch path and the second branch path are disposed between the one or the plurality of introduction portions and the first accommodation space in the ejection direction, and the communication portion and the second path do not directly communicate with each other.

According to the Aspect 8, as compared with the aspect in which the communication portion and the second path directly communicate with each other, the drive circuit can be efficiently cooled.

In Aspect 9 which is a specific example of the Aspect 8, the communication portion overlaps with the second path as viewed in a direction orthogonal to the ejection direction.

According to the Aspect 9, as described above, since the communication portion and the second path do not directly communicate with each other to efficiently cool the drive circuit and no gas is introduced from the side surface of the liquid ejecting head, the plurality of liquid ejecting heads can be disposed at a high density in the direction perpendicular to the ejection direction.

In Aspect 10 which is a specific example of the Aspect 3, the one or the plurality of introduction portions overlap with the first relay substrate in a plan view as viewed in the ejection direction, the communication portion includes a portion extending in a direction orthogonal to the ejection direction, and in the plan view, one end of both ends of the portion, which is far from the introduction portion, does not overlap with the first relay substrate.

By routing the communication portion to bypass the first relay substrate by the portion extending in the direction orthogonal to the ejection direction, the position where the introduction portion is provided is not limited in the plan view. That is, according to the Aspect 10, the degree of freedom of the position where the introduction portion is provided can be improved.

In Aspect 11 which is a specific example of the Aspect 2, an end portion of the communication portion coupled to the first accommodation space does not overlap with the plurality of head chips in a plan view as viewed in the ejection direction.

According to the Aspect 11, the gas can be easily flowed into the first accommodation space as compared with an aspect in which the gas is directly blown into the head chip.

In Aspect 12 which is a specific example of the Aspect 3, an end portion of the communication portion coupled to the first accommodation space does not overlap with the plurality of head chips in a plan view as viewed in the ejection direction, a wiring opening into which the first relay substrate or a second relay substrate coupled to the first relay substrate is inserted is formed on an outer wall of the liquid ejecting head, and the discharge portion is the wiring opening coupled to only one end of the second path.

According to the Aspect 12, the wiring opening, which is the only infiltration path for mist and paper dust, also functions as the discharge portion, so that the routing of the second path can be simplified and miniaturized, and the infiltration of mist and paper dust can be efficiently prevented.

In Aspect 13 which is a specific example of the Aspect 1, the number of the one or the plurality of introduction portions is smaller than the number of the plurality of head chips.

According to the Aspect 13, the components can be simplified as compared with the case where the head chips are provided with the introduction portions having a one-to-one correspondence, and the gas supply mechanism can be easily attached and detached.

In Aspect 14 which is a specific example of the Aspect 1, the number of the one or the plurality of introduction portions is one.

According to the Aspect 14, the components can be simplified as compared with the case where the plurality of introduction portions are provided, and the gas supply mechanism can be easily attached and detached.

In Aspect 15 which is a specific example of the Aspect 1, the drive circuit includes a switching element configured to select whether or not to supply a drive signal for driving a drive element for ejecting the liquid. The switching element generates heat by supplying the drive signal and switching between a state in which the drive signal is supplied and a state in which the drive signal is not supplied. According to the Aspect 15, it is possible to suppress a state in which the drive circuit cannot be sufficiently cooled depending on the image indicated by the image data as compared with the aspect in which one drive circuit of the first drive circuit and the second drive circuit is preferentially cooled.

In Aspect 16 which is a specific example of the Aspect 1, the plurality of head chips include a third head chip, the plurality of drive circuits include a third drive circuit for driving the third head chip, the gas path has a third branch path coupling the first path and the second path so as not to pass through the first branch path and the second branch path, and the third drive circuit is disposed in the third branch path.

According to the Aspect 16, since the gas not heated by the drive circuit is dispersed and blown to the first drive circuit, the second drive circuit, and the third drive circuit, the first drive circuit, the second drive circuit, and the third drive circuit can be uniformly cooled.

A liquid ejecting apparatus according to Aspect 17, which is another preferred aspect, includes: the liquid ejecting head according to any one of Aspects 1 to 16; and the gas supply mechanism that supplies the gas to the one or the plurality of introduction portions of the liquid ejecting head.

According to the Aspect 17, the first drive circuit and the second drive circuit can be uniformly cooled.

What is claimed is:

1. A liquid ejecting head comprising:

head chips configured to eject liquid in an ejection direction;

one or a plurality of introduction portions for introducing a gas supplied from a gas supply mechanism into an inside of the liquid ejecting head;

a discharge portion for discharging the gas supplied to the one or the plurality of introduction portions to an outside of the liquid ejecting head; and drive circuits provided in each of the head chips, wherein the head chips include a first head chip and a second head chip, the drive circuits include a first drive circuit for driving the first head chip and a second drive circuit for driving the second head chip, a gas path through which the gas flows from the one or the plurality of introduction portions to the discharge portion includes a first path coupled to the one or the plurality of introduction portions, a second path coupled to the discharge portion, a first branch path coupling the first path and the second path, and a second branch path coupling the first path and the second path so as not to pass through the first branch path, the first drive circuit is disposed in the first branch path, and the second drive circuit is disposed in the second branch path.

2. The liquid ejecting head according to claim 1, wherein the first path includes a first accommodation space accommodating the head chips and a communication portion through which the first accommodation space communicates with the one or the plurality of introduction portions, and each of the first branch path and the second branch path is coupled to the first accommodation space.

3. The liquid ejecting head according to claim 2, further comprising:

a first relay substrate coupled to the first head chip and the second head chip, wherein the second path includes a second accommodation space accommodating the first relay substrate, and each of the first branch path and the second branch path is coupled to the second accommodation space.

4. The liquid ejecting head according to claim 3, further comprising:

a first member stacked on the head chips in a direction opposite to the ejection direction and disposed between the first accommodation space and the second accommodation space;

a first wiring substrate that couples the first relay substrate and the first head chip and that is provided with the first drive circuit; and a second wiring substrate that couples the first relay substrate and the second head chip and that is provided with the second drive circuit, wherein the first member includes, a first through hole that penetrates in the ejection direction and into which the first wiring substrate is inserted, and a second through hole that penetrates in the ejection direction and into which the second wiring substrate is inserted are formed, the first branch path is the first through hole, and the second branch path is the second through hole.

5. The liquid ejecting head according to claim 1, further comprising:

a second member defining a first surface facing a direction opposite to the ejection direction of the liquid ejecting head, wherein the one or the plurality of introduction portions are provided on the first surface of the second member.

6. The liquid ejecting head according to claim 5, wherein a liquid introduction portion for introducing the liquid into the inside of the liquid ejecting head is provided on the first surface of the second member.

7. The liquid ejecting head according to claim 1, wherein the discharge portion discharges the gas to the outside of the liquid ejecting head in a direction opposite to the ejection direction.

8. The liquid ejecting head according to claim 2, wherein the first branch path and the second branch path are disposed between the one or the plurality of introduction portions and the first accommodation space in the ejection direction, and the communication portion and the second path do not directly communicate with each other.

9. The liquid ejecting head according to claim 8, wherein the communication portion overlaps with the second path as viewed in a direction orthogonal to the ejection direction.

10. The liquid ejecting head according to claim 3, wherein the one or the plurality of introduction portions overlap with the first relay substrate in a plan view as viewed in the ejection direction, the communication portion includes a portion extending in a direction orthogonal to the ejection direction, and in the plan view, one end of both ends of the portion, which is far from the introduction portion, does not overlap with the first relay substrate.

11. The liquid ejecting head according to claim 2, wherein an end portion of the communication portion coupled to the first accommodation space does not overlap with the head chips in a plan view as viewed in the ejection direction.

12. The liquid ejecting head according to claim 3, wherein an end portion of the communication portion coupled to the first accommodation space does not overlap with the head chips in a plan view as viewed in the ejection direction, a wiring opening into which the first relay substrate or a second relay substrate coupled to the first relay substrate is inserted is formed on an outer wall of the liquid ejecting head, and the discharge portion is the wiring opening coupled to only one end of the second path.

13. The liquid ejecting head according to claim 1, wherein the number of the one or the plurality of introduction portions is smaller than the number of the head chips.

14. The liquid ejecting head according to claim 1, wherein the number of the one or the plurality of introduction portions is one.

15. The liquid ejecting head according to claim 1, wherein the drive circuit includes a switching element configured to select whether or not to supply a drive signal for driving a drive element for ejecting the liquid.

16. The liquid ejecting head according to claim 1, wherein the head chips include a third head chip, the drive circuits include a third drive circuit for driving the third head chip, the gas path has a third branch path coupling the first path and the second path so as not to pass through the first branch path and the second branch path, and the third drive circuit is disposed in the third branch path.

17. A liquid ejecting apparatus comprising:

the liquid ejecting head according to claim 1; and the gas supply mechanism that supplies the gas to the one or the plurality of introduction portions of the liquid ejecting head.

* * * * *